(12) United States Patent
Liu et al.

(10) Patent No.: US 11,955,884 B2
(45) Date of Patent: Apr. 9, 2024

(54) RESONANT SWITCHING POWER CONVERTER CIRCUIT

(71) Applicant: Richtek Technology Corporation, Zhubei (TW)

(72) Inventors: Kuo-Chi Liu, Hsinchu (TW); Ta-Yung Yang, Taoyuan (TW); Chung-Lung Pai, Hsinchu (TW)

(73) Assignee: Richtek Technology Corporation, Zhubei (TW)

( * ) Notice: Subject to any disclaimer, the term of this patent is extended or adjusted under 35 U.S.C. 154(b) by 239 days.

(21) Appl. No.: 17/719,568

(22) Filed: Apr. 13, 2022

(65) Prior Publication Data

US 2022/0368218 A1 Nov. 17, 2022

Related U.S. Application Data

(60) Provisional application No. 63/188,126, filed on May 13, 2021.

(30) Foreign Application Priority Data

Mar. 28, 2022 (TW) ................... 111111733

(51) Int. Cl.
| | |
|---|---|
| *H02M 3/07* | (2006.01) |
| *H02M 1/36* | (2007.01) |
| *H02M 3/00* | (2006.01) |
| *H02M 3/158* | (2006.01) |
| *H02M 1/00* | (2006.01) |

(52) U.S. Cl.
CPC ............... *H02M 3/07* (2013.01); *H02M 1/36* (2013.01); *H02M 3/01* (2021.05); *H02M 3/158* (2013.01); *H02M 1/0095* (2021.05)

(58) Field of Classification Search
CPC ............ H02M 3/07; H02M 1/36; H02M 3/01; H02M 1/0095; H02M 3/015; H02M 3/1584; H02M 1/4241
See application file for complete search history.

(56) References Cited

U.S. PATENT DOCUMENTS

| | | | | |
|---|---|---|---|---|
| 10,340,794 | B1* | 7/2019 | Zhang | H02M 3/158 |
| 2019/0028025 | A1* | 1/2019 | Babazadeh | H01L 27/088 |
| 2019/0393776 | A1* | 12/2019 | Low | H02M 3/07 |
| 2022/0029531 | A1* | 1/2022 | Liu | H02M 3/01 |

* cited by examiner

*Primary Examiner* — Alex Torres-Rivera
(74) *Attorney, Agent, or Firm* — Tung & Associates

(57) ABSTRACT

A resonant switching power converter circuit including: a switching converter, a control circuit and a pre-charging circuit; wherein the control circuit controls a first switch of the switching converter in a pre-charging mode, so as to control electrical connections between a first power and at least one of plural capacitors of the switching converter, and to control other switches of the switching converter, so as to control the pre-charging circuit to charge at least one capacitor to a predetermined voltage; wherein in a start-up mode, the plural switches control electrical connections of the capacitors according to first and second operation signals, such that after the pre-charging mode ends, the switching converter subsequently operates in the start-up mode; wherein in the start-up mode, the first and second operation signals have respective ON periods, and the time lengths of the ON periods increase gradually.

43 Claims, 25 Drawing Sheets

Q2, Q3, Q8~Q10 are always OFF
C1, C3 are Floating

Q3, Q5, Q6, Q10 are always OFF
C3, C2 are Floating

RESONANT SWITCHING POWER CONVERTER CIRCUIT

CROSS REFERENCE

The present invention claims priority to U.S. 63/188,126 filed on May 13, 2021 and claims priority to TW 111111733 filed on Mar. 28, 2022.

BACKGROUND OF THE INVENTION

Field of Invention

The present invention relates to a resonant switching power converter circuit, and in particular to such resonant switching power converter circuit capable of executing pre-charging operation.

Description of Related Art

FIG. 1 shows a conventional power converter 10. This conventional power converter 10 includes a pre-stage DC-DC converter 101 for start-up control; the pre-stage DC-DC converter 101 includes two switches Qf1 and Qf2, an inductor Lf, a capacitor Cf and a buck controller 1011. In steady-state operation, this pre-stage DC-DC converter 101 consumes extra power and generates heat, which reduces the overall efficiency.

In view of the drawback of the prior art, the present invention proposes an innovated resonant switching power converter circuit.

SUMMARY OF THE INVENTION

In one aspect, the present invention provides a resonant switching power converter circuit which is configured to convert a first power to a second power or to convert the second power to the first power, wherein the first power includes a first voltage and a first current and the second power includes a second voltage and a second current, the resonant switching power converter circuit comprising: at least one switching converter; a control circuit, configured to control the switching converter; and a pre-charge circuit, coupled between the control circuit and the at least one switching converter; wherein the switching converter includes: a plurality of capacitors; a plurality of switches coupled to the plurality of capacitors, the plurality of switches being controlled by the control circuit to switch coupling relationships of the plurality of capacitors; at least one first inductor, which is connected in series with at least a corresponding one of the plurality of capacitors; and at least one second inductor, which is connected in series with at least a corresponding one of the plurality of capacitors; wherein the control circuit is coupled to the first power, the second power, and the plurality of switches, wherein when the switching converter operates in a pre-charge mode, the control circuit is configured to control a first switch of the plurality of switches to control a coupling relationship between the first power and a first capacitor of the plurality of capacitors, and is configured to control the other switches of the plurality of switches so that when one or more of the plurality of capacitors has a voltage drop which is lower than a predetermined voltage, the pre-charge circuit charges the one or more capacitors to the predetermined voltage; wherein the first switch is coupled between the first power and the first capacitor; wherein in a start-up mode, a first control signal and at least one second control signal operate the plurality of switches to switch coupling relationships of capacitors coupled to the plurality of switches, such that after the pre-charge mode ends, the resonant switching power converter circuit operates in the start-up mode; wherein in the start-up mode, the first control signal and the at least one second control signal have respective ON periods which do not overlap one another, and time lengths of the ON periods increase gradually; wherein in a resonant voltage conversion mode, the first control signal and the at least one second control signal operate the plurality of switches to switch coupling relationships of capacitors coupled to the plurality of switches, such that after the start-up mode ends, the resonant switching power converter circuit operates in the resonant voltage conversion mode, to convert the first power to the second power or to convert the second power to the first power; wherein in the resonant voltage conversion mode, the first control signal and the at least one second control signal have respective ON periods which do not overlap one another, such that a first process of the resonant voltage conversion mode and a second process of the resonant voltage conversion mode do not overlap each other; wherein in the first process, the first control signal operates the plurality of switches so that a series connection of the plurality of capacitors which is further connected in series to the first inductor is formed between the first power and the second power, so as to form a first current path, whereas, in the second process, the at least one second control signals operate the plurality of switches so that each of the plurality of capacitors is individually connected in series to a corresponding one of the second inductors, so as to form plural second current paths concurrently or sequentially; wherein the first process and the second process are performed in a repeated and alternating manner, so as to convert the first power to the second power or to convert the second power to the first power.

In one embodiment, in the first process, the first control signal controls the plurality of switches so that at least one of the plurality of capacitors is connected in parallel with the second power, and in the second process, the at least one second control signal control the plurality of switches so that at least another one of the plurality of capacitors is connected in parallel with the second power, wherein the capacitor connected in parallel with the second power in the first process is different from the capacitor connected in parallel with the second power in the second process.

In one embodiment, the plurality of capacitors include a first capacitor, a second capacitor and a third capacitor; wherein in the first process, the plurality of switches operate so that the first capacitor and the third capacitor are connected in series between the first power and the second power, and so that the second capacitor is connected in parallel with the second power; and wherein in the second process, the plurality of switches operate so that the second capacitor and the first capacitor are connected in series between the second power and a ground level, and so that the third capacitor is connected in parallel with the second power.

In one embodiment, the plurality of switches include a first switch, a second switch, a third switch, a fourth switch, a fifth switch, a sixth switch, a seventh switch, an eighth switch, a ninth switch, and a tenth switch; wherein in the first process, the first switch, the second switch and the third switch are ON so that the first capacitor and the third capacitor are connected in series between the first power and the second power, and the fourth switch and the fifth switch are ON so that the second capacitor is connected in parallel with the second power, and the sixth to tenth switches are OFF; and wherein in the second process, the sixth switch, the seventh switch and the eighth switch are ON so that the second capacitor and the first capacitor are connected in series between the second power and the ground level, and the ninth switch and the tenth switch are ON so that the third capacitor is connected in parallel with the second power.

In one embodiment, the plurality of capacitors further include an output capacitor coupled to the first capacitor, the second capacitor and the third capacitor, and the predetermined voltage includes a first predetermined voltage and a second predetermined voltage; wherein in the pre-charge mode, the control circuit executes at least one of the following operations: (1) turning ON the fourth switch, the fifth switch, the seventh switch, the ninth switch and the tenth switch, and controlling the pre-charge circuit to charge each of the output capacitor, the third capacitor and the second capacitor to the first predetermined voltage; (2) turning ON the second switch and the tenth switch, and controlling the pre-charge circuit to charge the third capacitor to the first predetermined voltage; (3) turning ON the fifth switch, the seventh switch and the eighth switch, and controlling the pre-charge circuit to charge each of the second capacitor and the first capacitor to the first predetermined voltage; or (4) turning ON the eighth switch, and controlling the pre-charge circuit to charge the first capacitor to the second predetermined voltage.

In one embodiment, the first predetermined voltage is a target voltage of the second voltage of the second power, and the second predetermined voltage is two-fold of the target voltage of the second voltage of the second power.

In one embodiment, wherein the resonant switching power converter circuit further includes one of the following configurations and executes corresponding operations: (1) wherein the third capacitor is further directly connected to the first inductor to form a first resonant tank, and the second capacitor is further directly connected to the second inductor to form a second resonant tank; wherein in the first process, the plurality of switches further control the first resonant tank and the first capacitor to be connected in series with each other between the first power and the second power, and control the second resonant tank to be connected in parallel with the second power; and wherein in the second process, the plurality of switches further control the second resonant tank and the first capacitor to be connected in series with each other between the second power and the ground level, and control the first resonant tank to be connected in parallel with the second power; (2) wherein a same one single inductor serves as both the first inductor and the second inductor, and this same one single inductor is coupled between the second power and a switching node; wherein in the first process, the plurality of switches further control the first capacitor and the third capacitor to be connected in series with said same one single inductor to form a first series circuit between the first power and the second power, and control the second capacitor to be connected in series with said same one single inductor to form a second series circuit and the second series circuit is connected in parallel with the second power; and wherein in the second process, the plurality of switches further control the second capacitor and the first capacitor to be connected in series with said same one single inductor to form a third series circuit between the second power and the ground level, and control the third capacitor to be connected in series with said same one single inductor to form a fourth series circuit and the fourth series circuit is connected in parallel with the second power; or (3) wherein the first inductor is coupled between the second power and a first switching node, and the second inductor is coupled between the second power and a second switching node; wherein in the first process, the plurality of switches further control the first capacitor and the third capacitor to be connected in series with the first inductor via the first switching node to form a first series circuit between the first power and the second power, and control the second capacitor to be connected in series with the second inductor via the second switching node to form a second series circuit and the second series circuit is connected in parallel with the second power; and wherein in the second process, the plurality of switches further control the second capacitor and the first capacitor to be connected in series with the second inductor via the second switching node to form a third series circuit between the second power and the ground level, and control the third capacitor to be connected in series with the first inductor via the first switching node to form a fourth series circuit and the fourth series circuit is connected in parallel with the second power.

In one embodiment, the at least one switching converter includes a first switching converter and a second switching converter, wherein the first switching converter and the second switching converter are connected in parallel between the first power and the second power, wherein each of the first switching converter and the second switching converter operates the corresponding plurality of switches therein in opposite phases to the other of the first switching converter and the second switching converter.

In one embodiment, in the configuration (3), both the first inductor and the second inductor operate in a continuous conduction mode.

In one embodiment, the resonant switching power converter circuit further comprises an upper layer capacitor and a plurality of upper layer switches, wherein the at least one switching converter includes a first switching converter and a second switching converter, wherein the upper layer capacitor, the plurality of upper layer switches, the first switching converter and the second switching converter are coupled with one another to form a fundamental topology; wherein in the first process, the plurality of upper layer switches further control the first switching converter and the upper layer capacitor to be connected in series with each other between the first power and the second power, and control the second switching converter to be connected in parallel with the second power; and wherein in the second process, the plurality of upper layer switches further control the second switching converter and the upper layer capacitor to be connected in series with each other between the second power and the ground level, and control the first switching converter to be connected in parallel with the second power.

In one embodiment, a ratio between the first voltage of the first power and the second voltage of the second power is 8.

In one embodiment, the resonant switching power converter circuit further comprises: a further upper layer capacitor, a plurality of further upper layer switches, a further upper layer first switching converter and a further upper layer second switching converter, wherein the further upper layer capacitor, the plurality of further upper layer switches, the further upper layer first switching converter and the further upper layer second switching converter are coupled to one another according to the fundamental topology so that the fundamental topology expands recursively, wherein each of the further upper layer first switching converter and the further upper layer second switching converter has a configuration corresponding to the resonant switching power converter circuit of a layer below.

In one embodiment, the at least one first inductor includes a plurality of charging inductors which are connected in series with the plurality of capacitors respectively, and the at least one second inductor includes a plurality of discharging inductors; wherein in the first process, the plurality of switches operate so that a series connection of the plurality of capacitors and the plurality of charging inductors is formed between the first power and the second power, so as to form a first current path, whereas, in the second process, the plurality of switches operate so that each of the plurality of capacitors is individually connected in series to a corresponding one of the discharging inductors, so as to form plural second current paths in parallel.

In one embodiment, the at least one first inductor and the at least one second inductor have a coupled inductance.

In one embodiment, the at least one first inductor and the at least one second inductor which have the coupled inductance are configured as coupled inductors or configured as a transformer.

In one embodiment, the at least one first inductor is one single first inductor and the at least one second inductor is one single second inductor.

In one embodiment, an inductance of the one single first inductor is identical to an inductance of the one single second inductor.

In one embodiment, one same single inductor serves as the at least one first inductor and the at least one second inductor.

In one embodiment, the first process has a first resonant frequency and the second process has a second resonant frequency, and the first resonant frequency and the second resonant frequency are identical.

In one embodiment, the first process has a first resonant frequency and the second process has a second resonant frequency, and the first resonant frequency and the second resonant frequency are different.

In one embodiment, a voltage conversion ratio between the first voltage of the first power to the second voltage of the second power is adjustable to be 4:1, 3:1 or 2:1.

In one embodiment, a voltage conversion ratio between the first voltage of the first power to the second voltage of the second power is 4:1.

In one embodiment, in a steady state, a voltage across the first capacitor is equal to two-fold of the second voltage, a voltage across the third capacitor is equal to the second voltage, and a voltage across the second capacitor is equal to the second voltage.

In one embodiment, one same single inductor serves as the at least one first inductor and the at least one second inductor; wherein in a two-fold conversion mode, a portion of the plurality of switches are always ON, another portion of the plurality of switches are always OFF, and a further other portion of the plurality of switches are configured to switch one of the second capacitor and the first capacitor so that in the first process, the switched one capacitor is connected in series with the one same single inductor between the first power and the second power, and in the second process, the switched one capacitor is connected in series with the one same single inductor and the series connection is connected in parallel with the second power, such that a ratio between the first voltage of the first power and the second voltage of the second power is 2, wherein the switched one capacitor and the one same single inductor operate in resonant fashion to achieve power conversion between the first power and the second power.

In one embodiment, in a two-fold conversion mode, a portion of the plurality of switches are always ON, another portion of the plurality of switches are always OFF, and a further other portion of the plurality of switches are configured to switch the first capacitor so that in the first process, the first capacitor is connected in series with the first inductor between the first power and the second power, and in the second process, the first capacitor is connected in series with the first inductor and the series connection is connected in parallel with the second power, such that a ratio between the first voltage of the first power and the second voltage of the second power is 2, wherein the first capacitor and the first inductor operate in resonant fashion to achieve power conversion between the first power and the second power.

In one embodiment, one same single inductor serves as the at least one first inductor and the at least one second inductor; wherein in a three-fold conversion mode, a portion of the plurality of switches are always ON, another portion of the plurality of switches are always OFF, and a further other portion of the plurality of switches are configured to switch the first capacitor and the third capacitor so that in the first process, the first capacitor and the third capacitor are connected in series with the one same single inductor between the first power and the second power, and in the second process, the first capacitor and the third capacitor are connected in parallel and the parallel connection is connected in series with the one same single inductor, and the series connection is connected in parallel with the second power, such that a ratio between the first voltage of the first power and the second voltage of the second power is 3, wherein the first capacitor and the one same single inductor operate in resonant fashion, and/or, the third capacitor and the one same single inductor operate in resonant fashion, to achieve power conversion between the first power and the second power.

In one embodiment, in a three-fold conversion mode, a portion of the plurality of switches are always ON, another portion of the plurality of switches are always OFF, and a further other portion of the plurality of switches are configured to switch the first capacitor and the third capacitor so that in the first process, the first capacitor and the third capacitor are connected in series with the first inductor between the first power and the second power, and in the second process, the first capacitor and the third capacitor are connected in series with the second inductor and the first inductor respectively, and the series connections are connected in parallel with the second power, such that a ratio between the first voltage of the first power and the second voltage of the second power is 3, wherein the first capacitor and the second inductor operate in resonant fashion, and/or, the third capacitor and the first inductor operate in resonant fashion, to achieve power conversion between the first power and the second power.

In one embodiment, a ratio between the predetermined voltage and the first voltage of the first power is constant.

In one embodiment, one same single inductor serves as the at least one first inductor and the at least one second inductor, wherein a capacitance of the first capacitor is far more greater than a capacitance of the third capacitor and a capacitance of the second capacitor, such that a first resonant frequency of the third capacitor and the one same single inductor and a second resonant frequency of the second capacitor and the one same single inductor are both greater than or equal to 10-fold of a third resonant frequency of the first capacitor and the one same single inductor.

In another aspect, the present invention provides a resonant switching power converter circuit which is configured to convert a first power to a second power or to convert the second power to the first power, wherein the first power includes a first voltage and a first current and the second power includes a second voltage and a second current, the resonant switching power converter circuit comprising: at least one resonant tank which includes a resonant capacitor and a resonant inductor connected in series with each other; a plurality of switches coupled to the at least one resonant tank, wherein in a resonant voltage conversion mode, the plurality of switches operate according to a first control signal and a second control signal to switch a coupling relationship of the at least one resonant tank in correspondence to a first resonant process and a second resonant process, wherein in the first resonant process a resonant charging operation is performed on the at least one resonant tank, and in the second resonant process a resonant discharging operation is performed on the at least one resonant tank; a control circuit, configured to control the plurality of switches; a pre-charge circuit, coupled between the control circuit and the plurality of switches except a first switch of the plurality of switches; and at least one non-resonant capacitor, coupled to the at least one resonant tank, wherein in the resonant voltage conversion mode, the first control signal and the second control signal switching coupling relationships of the non-resonant capacitor and the at least one resonant tank, and a voltage across the non-resonant capacitor is maintained at a constant ratio to the first power; wherein the control circuit is coupled to the first power, the second power, and the plurality of switches, wherein when the resonant switching power converter circuit operates in a pre-charge mode, the control circuit is configured to control the first switch to control a coupling relationship between the first power and the at least one resonant tank, and is configured to control the other switches of the plurality of switches so that when one or more of the resonant capacitor and the at least one non-resonant capacitor has a voltage drop which is lower than a predetermined voltage, the pre-charge circuit charges the one or more capacitors to the predetermined voltage; wherein the first switch is coupled between the first power and the resonant capacitor; wherein in a start-up mode, the first control signal and the second control signal operate the plurality of switches to switch coupling relationships of the resonant capacitor and the non-resonant capacitor, such that after the pre-charge mode ends, the resonant switching power converter circuit operates in the start-up mode; wherein in the start-up mode, the first control signal and the second control signal have respective ON periods which do not overlap one another, and time lengths of the ON periods increase gradually; wherein in a resonant voltage conversion mode, the first control signal and the second control signal have respective ON periods which do not overlap one another, such that the first resonant process and the second resonant process do not overlap each other, such that after the start-up mode ends, the resonant switching power converter circuit operates in the resonant voltage conversion mode, to convert the first power to the second power or to convert the second power to the first power.

In one embodiment, the predetermined voltage is a target voltage of the second voltage of the second power.

In one embodiment, the predetermined voltage is a multiple of a target voltage of the second voltage of the second power.

In one embodiment, the pre-charge circuit includes: a current source, which is configured to generate a pre-charge current; a pre-charge switch circuit, which is coupled between the current source and the plurality of switches except the first switch, wherein in the pre-charge mode, the control circuit controls the pre-charge switch circuit and the plurality of switches except the first switch, so as to control a coupling relationship between the current source and one or more of the resonant capacitor and the at least one non-resonant capacitor, to thereby charge the one or more capacitors to the predetermined voltage by the pre-charge current.

In one embodiment, the control circuit includes: a duty ratio determination circuit, which is configured to compare a ramp-up voltage at a ramp-up node with a periodic waveform signal, so as to generate a duty ratio signal; a duty ratio distribution circuit, which is configured to generate the first control signal and the second control signal according to the duty ratio signal; and a ramp-up voltage generation circuit, which is coupled to the duty ratio determination circuit and which is configured to generate the ramp-up voltage at the ramp-up node in the start-up mode; wherein the ramp-up voltage at the ramp-up node increases gradually in the start-up mode, so that the duty ratios of the first control signal and the second control signal increase gradually.

In one embodiment, in the pre-charge mode, the control circuit controls a conduction level of the first switch, so that a pre-charge current flows from the first power through the first switch to one or more of the resonant capacitor and the at least one non-resonant capacitor, to charge the one or more capacitors to the predetermined voltage.

In one embodiment, a ratio between the predetermined voltage and the first voltage of the first power is constant.

In one embodiment, the resonant switching power converter circuit comprises at least two resonant capacitors including a first resonant capacitor and a second resonant capacitor, and wherein the predetermined voltage includes a first predetermined voltage, a second predetermined voltage and a third predetermined voltage, and wherein the plurality of switches include the first switch, a second switch, a third switch, a fourth switch, a fifth switch, a sixth switch, a seventh switch, an eighth switch, a ninth switch, and a tenth switch; wherein in the pre-charge mode, the control circuit executes at least one of the following operations: (1) turning ON the sixth switch, and controlling the pre-charge circuit to charge the first resonant capacitor to the first predetermined voltage; (2) turning ON the second switch and the eighth switch, and controlling the pre-charge circuit to charge the non-resonant capacitor to the second predetermined voltage; or (3) turning ON the second switch, the third switch and the tenth switch, and controlling the pre-charge circuit to charge the second resonant capacitor to the third predetermined voltage.

In one embodiment, the first predetermined voltage is three-fold of a target voltage of the second voltage of the second power; the second predetermined voltage is two-fold of the target voltage of the second voltage; and the third predetermined voltage is the target voltage of the second voltage Advantages of the present invention include: that a pre-charge mode can be achieved simply by existing switches; that the resonant switching power converter circuit of the present invention supports hot-swapping operation; that a start-up operation can be achieved by existing power devices without requiring an extra pre-stage DC-DC converter; that fewer components and less space are required; that the power conversion efficiency is improved due to omitting the extra pre-stage DC-DC converter; that the resonant switching power converter circuit of the present invention supports soft-starting operation and supports parallel operations for use in a multi-phase resonant switching power converter circuit.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
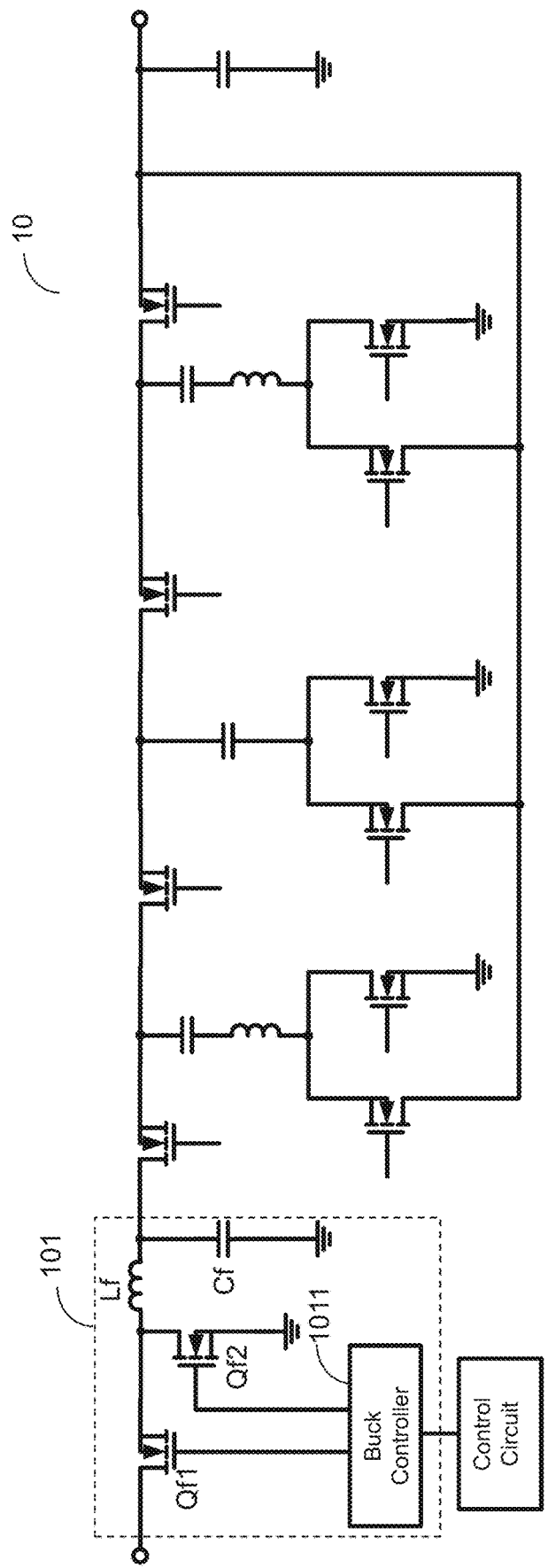
FIG. 1 shows a schematic circuit diagram of a conventional power converter.
Figure 2:
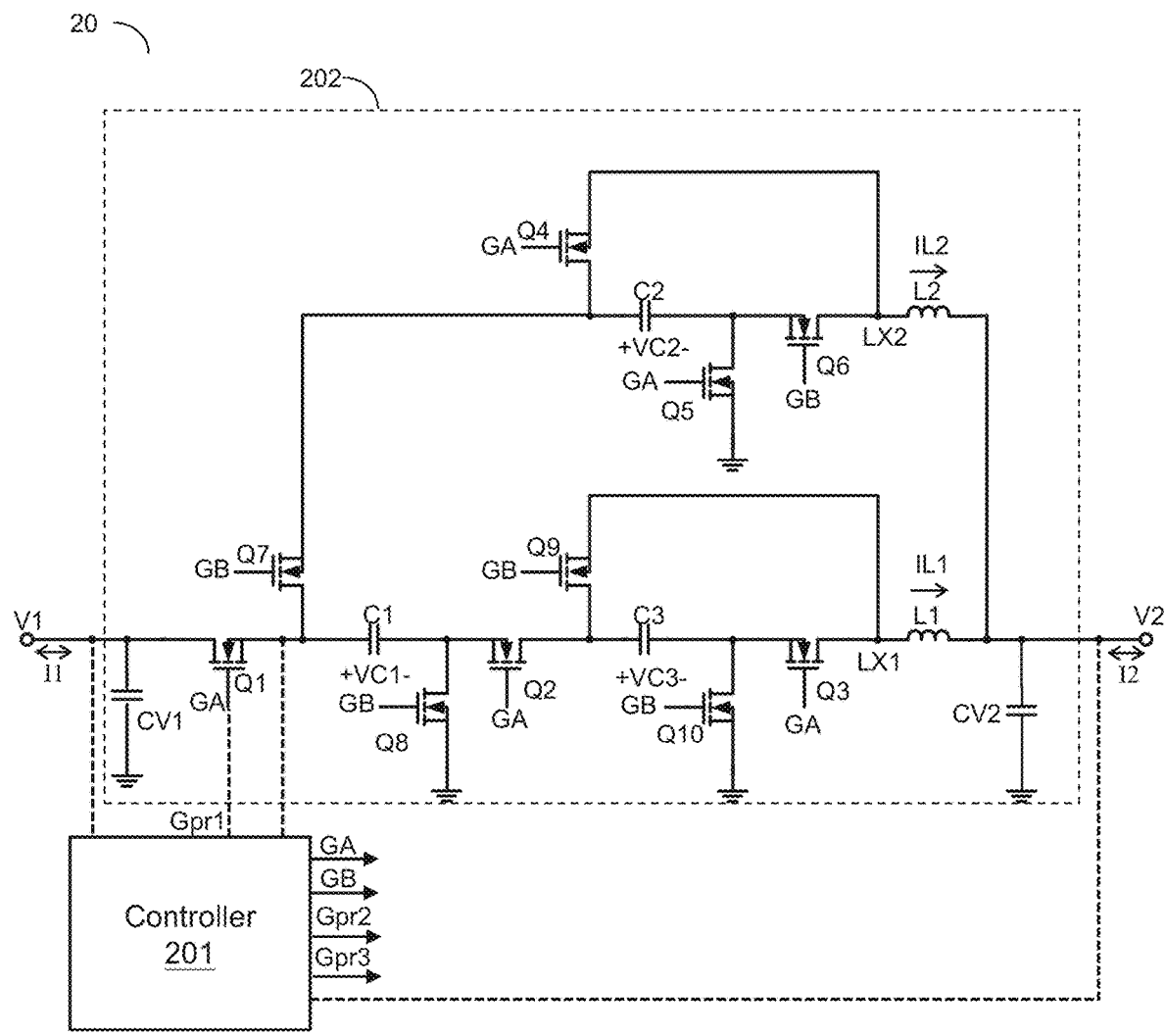
FIG. 2 shows a schematic circuit diagram of a resonant switching power converter circuit according to an embodiment of the present invention.

FIG. 2 illustrates a schematic diagram of a resonant switching power converter circuit in accordance with one embodiment of the present invention. The resonant switching power converter circuit 20 is configured to operably convert a first power (corresponding to a first voltage V1 and a first current I1) to a second power (corresponding to a second voltage V2 and a second current I2) or is configured to operably convert the second power to the first power. In this embodiment, the resonant switching power converter circuit 20 includes a switching converter 202. The switching converter 202 includes: a first capacitor (i.e., capacitor C1), a second capacitor (i.e., capacitor C2), a third capacitor (i.e., capacitor C3) which are coupled with one another and a plurality of switches Q1~Q10.

In one embodiment, during a first process, the switches Q1~Q10 are configured to operably control the first capacitor (i.e., capacitor C1) and the third capacitor (i.e., capacitor C3) to be electrically connected in series between the first power and the second power, and to operably control the second capacitor (i.e., capacitor C2) to be electrically connected in parallel to the second power, wherein the other end of the second capacitor (i.e., capacitor C2) is controlled to be coupled to a ground voltage level. Specifically, the switches Q1~Q3 are ON, so as to control the first capacitor (i.e., capacitor C1) and the third capacitor (i.e., capacitor C3) to be electrically connected in series between the first power and the second power, whereas, the switches Q4~Q5 are ON, so as to control the second capacitor (i.e., capacitor C2) to be electrically connected in parallel to the second power; in the meantime, the switches Q6~Q10 are OFF. In this embodiment, during the first process, the control signal GA is in enable state, so that the switches controlled by the control signal GA are ON. On the other hand, during the first process, the control signal GB is in disable state, so that the switches controlled by the control signal GB are OFF.

During a second process, the switches Q1~Q10 are configured to operably control the second capacitor (i.e., capacitor C2) and the first capacitor (i.e., capacitor C1) to be electrically connected in series between the second power and a ground voltage level, and to operably control the third capacitor (i.e., capacitor C3) to be electrically connected in parallel to the second power. In one embodiment, during the second process, the second capacitor (i.e., capacitor C2) and the first capacitor (i.e., capacitor C1) are electrically connected in series in a reversed direction between the second power and the ground voltage level. Specifically, the switches Q6~Q8 are ON, so as to control the second capacitor (i.e., capacitor C2) and the first capacitor (i.e., capacitor C1) to be electrically connected in series between the second power and the ground voltage level, and the switches Q9~Q10 are ON, so as to control the third capacitor (i.e., capacitor C3) to be electrically connected in parallel to the second power; in the meantime, the switches Q1~Q5 are OFF. In this embodiment, during the second process, the control signal GA is in disable state, so that the switches controlled by the control signal GA are OFF. On the other hand, during the second process, the control signal GB is in enable state, so that the switches controlled by the control signal GB are ON.

The resonant switching power converter circuit 20 executes power conversion between the first power and the second power through periodically conducting the above-mentioned operations. In this embodiment, a ratio of the first voltage V1 of the first power to the second voltage V2 of the second power is equal to 4.

It is worthwhile noting that, in one embodiment, as one having ordinary skill in the art readily understands, the term "electrically connected in series 'in a reversed direction'", refers to that the voltage across the second capacitor (i.e., capacitor C2) and the voltage across the first capacitor (i.e., capacitor C1) are in opposite direction to each other (i.e., the direction from the positive end to the negative end of the capacitor C2 is opposite to the direction from the positive end to the negative end of the capacitor C1).

In the embodiment wherein the first power is converted to the second power, during the first process, the first power charges the first capacitor (i.e., capacitor C1) and the third capacitor (i.e., capacitor C3) which are electrically connected in series, whereas, the second capacitor (i.e., capacitor C2) is discharged, to thereby supply power to the second power; that is, the second capacitor (i.e., capacitor C2) charges a capacitor CV2 coupled to the second power. On the other hand, during the second process, the first capacitor (i.e., capacitor C1) charges the second capacitor (i.e., capacitor C2) and the second power.

In addition, in the embodiment wherein the second power is converted to the first power, during the first process, the second power charges the first capacitor (i.e., capacitor C1) and the third capacitor (i.e., capacitor C3) which are electrically connected in series and the second power charges the second capacitor (i.e., capacitor C2). On the other hand, during the second process, the second power charges the third capacitor (i.e., capacitor C3), and the second power charges the first capacitor (i.e., capacitor C1) via the second capacitor (i.e., capacitor C2).

Through periodically conducting the above-mentioned operations, in this embodiment, in a steady state (that is, when the switching converter 202 operates in a resonant voltage conversion mode, which will be described in detail later), a ratio of the voltage VC1 across the first capacitor (i.e., capacitor C1) to the second voltage V2 is equal to 2. A ratio of a voltage VC3 across the third capacitor (i.e., capacitor C3) to the second voltage V2 is equal to 1. And, a ratio of a voltage VC2 across the second capacitor (i.e., capacitor C2) to the second voltage V2 is equal to 1. In an implementation wherein the second voltage V2 is equal to 12V, in a steady state, the voltage VC3 across the third capacitor (i.e., capacitor C3) and the voltage VC2 across the second capacitor (i.e., capacitor C2) are both equal to 12V. It is worthwhile noting that, because the present invention can ensure a voltage across a capacitor to be kept at a relatively lower voltage level in a steady state, the effective capacitance of such capacitor will be relatively higher. As a result, both the required voltage withstanding capability and the required size for such capacitor can be effectively decreased. Besides, under such situation, the resonant frequency of the present invention is relatively stabler and the transient response is better. Moreover, it is worthwhile noting that, because the output current (e.g., corresponding to the second current I2) of the present invention are provided by two channels, ripple can be reduced.

In the embodiment wherein the first power is converted to the second power, the capacitor CV1 coupled to the first power and the capacitor CV2 coupled to the second power correspond to an input capacitor and an output capacitor, respectively. Or, in the embodiment wherein the second power is converted to the first power, the capacitor CV1 coupled to the first power and the capacitor CV2 coupled to the second power correspond to an output capacitor and an input capacitor, respectively.

The switching converter 202 of this embodiment further includes an inductor L1 and an inductor L2. The inductor L1 is coupled between the second power and a first switching node LX1, whereas, the inductor L2 is coupled between the second power and a second switching node LX2. During the first process, the switches Q1~Q10 control the first capacitor (i.e., capacitor C1) and the third capacitor (i.e., capacitor C3) to be electrically connected in series to the inductor L1 via the first switching node LX1, and the series circuit formed by the first capacitor (i.e., capacitor C1), the third capacitor (i.e., capacitor C3) and the inductor L1 is electrically connected in series between the first power and the second power, and the switches Q1~Q10 control the second capacitor (i.e., capacitor C2) to be electrically connected in series to the inductor L2 via the second switching node LX2, and the series circuit formed by the second capacitor (i.e., capacitor C2) and the inductor L2 is electrically connected in parallel to the second power. On the other hand, during the second process, the switches Q1~Q10 control the second capacitor (i.e., capacitor C2) and the first capacitor (i.e., capacitor C1) to be electrically connected in series to the inductor L2 via the second switching node LX2, and the series circuit formed by the second capacitor (i.e., capacitor C2), the first capacitor (i.e., capacitor C1) and the inductor L2 is electrically connected in series between the second power and the ground voltage level, and the switches Q1~Q10 control the third capacitor (i.e., capacitor C3) to be electrically connected in series to the inductor L1 via the first switching node LX1, and the series circuit formed by the third capacitor (i.e., capacitor C3) and the inductor L1 is electrically connected in parallel to the second power. In one embodiment, both the inductor L1 and the inductor L2 operate in a continuous conduction mode, thereby further reducing inrush current and ripple current.

In one embodiment, the capacitance of the first capacitor (i.e., capacitor C1) is far more greater than the capacitance of the third capacitor (i.e., capacitor C3) and the capacitance of the second capacitor (i.e., capacitor C2), so that a first resonant frequency of the third capacitor (i.e., capacitor C3) and the inductor is far more greater than a third resonant frequency of the first capacitor (i.e., capacitor C1) and the inductor, and a second resonant frequency of the second capacitor (i.e., capacitor C2) and the inductor is far more greater than a third resonant frequency of the first capacitor (i.e., capacitor C1) and the inductor. In one embodiment, the first resonant frequency and the second resonant frequency are both greater than or equal to ten times of the third resonant frequency.

Figure 3:
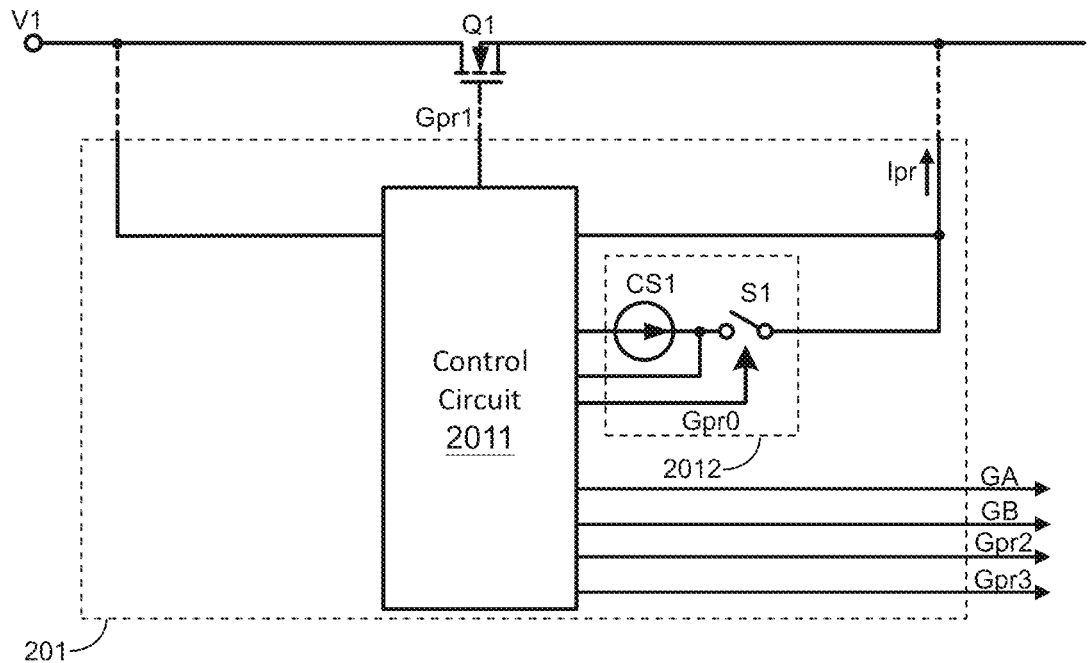
FIG. 3 shows a schematic circuit diagram of a controller of a resonant switching power converter circuit according to an embodiment of the present invention.

FIG. 3 shows a schematic circuit diagram of a controller of a resonant switching power converter circuit according to an embodiment of the present invention. Please refer to FIG. 3 in conjunction with FIG. 2. The resonant switching power converter circuit 20 further includes a controller 201. The controller 201 includes a control circuit 2011 and a pre-charge circuit 2012. The control circuit 2011 is coupled to the first power, the second power, the switches Q1~Q10, and a node between the first switch (e.g., switch Q1) and the seventh switch (e.g., switch Q7), and the control circuit 2011 is configured to control the switching converter 202. The pre-charge circuit 2012 is coupled between the control circuit 2011 and the switching converter 202. When the switching converter 202 operates in a pre-charge mode, the control circuit 2011 is configured to generate a pre-charge operation signal Gpr1 to control the first switch (e.g., switch Q1) of the switches Q1~Q10, so as to control a coupling relationship between the first power and the first capacitor (e.g., capacitor Q1) of the plural capacitors (capacitors Q1~Q3), such as to turn OFF the switch Q1 so that the first capacitor C1 is disconnected from the first power, and the control circuit 2011 is configured to generate pre-charge operation signals Gpr2 and Gpr3 to control the other switches (e.g., switches Q2~Q10) of the switches Q1~Q10, so that when one or more of the capacitors Q1~Q3 have a voltage drop which is lower than a predetermined voltage, the pre-charge circuit 2012 charges the one or more capacitors to the predetermined voltage. Besides, in the pre-charge mode, the control circuit 2011 also generates a pre-charge operation signal Gpr0 to control a pre-charge switch circuit S1, so that in the pre-charge mode, a pre-charge current generated by a current source CS1 charges the capacitors CV2, C1, C2 and/or C3 when the aforementioned other switches (e.g., switches Q2~Q10) are controlled by the pre-charge operation signals Gpr2 and Gpr3.

In one embodiment, in the pre-charge mode, the control circuit 2011 generates the pre-charge operation signals Gpr0, Gpr1, Gpr2 and Gpr3, to execute at least one of the following operations: (1) turning ON the switches Q4, Q5, Q7, Q9 and Q10, and controlling the pre-charge circuit 2012 to charge each of the capacitors CV2, C3 and C2 to a first predetermined voltage; (2) turning ON the switches Q2 and Q10, and controlling the pre-charge circuit 2012 to charge the capacitor C3 to the first predetermined voltage; (3) turning ON the switches Q5, Q7 and Q8, and controlling the pre-charge circuit 2012 to charge each of the capacitors C2 and C1 to the first predetermined voltage; or (4) turning ON the switch Q8, and controlling the pre-charge circuit 2012 to charge the capacitor C1 to the second predetermined voltage. In one embodiment, the first predetermined voltage is the target voltage of the second voltage V2 of the second power, and the second predetermined voltage is two-fold of the target voltage of the second voltage V2.

In another embodiment, in the pre-charge mode, the control circuit 2011 controls the conduction level of the first switch (e.g., switch Q1), such that the pre-charge current flows from the first power through the first switch to one or more of the capacitors (e.g., capacitors C1-C3), to charge the one or more capacitors to a predetermined voltage. In one embodiment, the predetermined voltage is the target voltage of the second voltage V2 of the second power. In another embodiment, the predetermined voltage is a multiple of the target voltage of the second voltage V2 of the second power, for example but not limited to one-fold, two-fold, etc. In this embodiment, the first switch is the switch Q1 and the first capacitor is the capacitor C1. As shown in FIGS. 2 and 3, the first switch (Q1) is coupled between the first power and the first capacitor (C1).

In a start-up mode after the pre-charge mode, the control signal GA and at least one control signal GB control the switches Q1~Q10, so as to control the coupling relationships of the capacitors corresponding to the switches Q1~Q10 for start-up operation; in the start-up mode, each of the control signal GA and the at least one control signal GB is switched to an ON level for an ON period, and the ON periods of the control signal GA and the at least one control signal GB do not overlap with one another. In one embodiment, the time lengths of the ON periods increase gradually.

After the start-up mode ends, the resonant switching power converter circuit 20 enters into a resonant voltage conversion mode. In the resonant voltage conversion mode, the control signal GA and the at least one control signal GB control the switches Q1~Q10, so as to control the coupling relationships of the capacitors corresponding to the switches Q1~Q10 for resonant voltage conversion; in the resonant voltage conversion mode, the resonant switching power converter circuit 20 converts the first power to the second power or converts the second power to the first power. In one embodiment, the resonant switching power converter circuit 20 can be connected to and disconnected from the first power by hot-swapping.

As shown in FIG. 3, in one embodiment, the pre-charge circuit 2012 includes the current source CS1 and the pre-charge switch circuit S1. The current source CS1 is configured to generate a pre-charge current Ipr, and the pre-charge switch circuit S1 is coupled between the current source CS1 and the switches (e.g., switches Q2~Q10) except the first switch (e.g., switch Q1). In the pre-charge mode, the control circuit 2011 generates the pre-charge operation signal Gpr0 to control the pre-charge switch circuit S1, and generates the pre-charge operation signals Gpr2 and Gpr3 to control the switches (switches Q2~Q10) other than the first switch (switch Q1), and to control the coupling relationship between the current source CS1 and one or more of the capacitors (capacitors C1~C3), so as to charge the one or more capacitors to the predetermined voltage by the pre-charge current Ipr.

It is worthwhile mentioning that, in the pre-charge mode, the control circuit 2011 can generate the pre-charge operation signal Gpr1 to control the conduction level of the switch Q1, so that the first current I1 can function as a pre-charge current; the control circuit 2011 generates the pre-charge operation signals Gpr2 and Gpr3 to control the other switches (e.g., switches Q2~Q10), such that the first current I1 flows from the first power through the first switch Q1 to one or more of the capacitors (e.g., capacitors C1~C3), to charge the one or more capacitors to the predetermined voltage. Thus, when one or more of the capacitors C1~C3 have a voltage drop which is lower than the predetermined voltage, the control circuit 2011 can control the conduction level of the switch Q1 to charge the one or more capacitors to the predetermined voltage. On the other hand, alternatively, the control circuit 2011 can generate the pre-charge operation signal Gpr0 to turn ON the pre-charge switch circuit S1 so as to provide the pre-charge current Ipr, and the control circuit 2011 can also generate the pre-charge operation signals Gpr2 and Gpr3 to control the other switches (e.g., switches Q2~Q10), such that when one or more of the capacitors C1~C3 have a voltage drop which is lower than the predetermined voltage, the control circuit 2011 can control the pre-charge circuit 2012 to charge the one or more capacitors to the predetermined voltage. The above two pre-charge operations can be executed individually or in combination.

Figure 4:
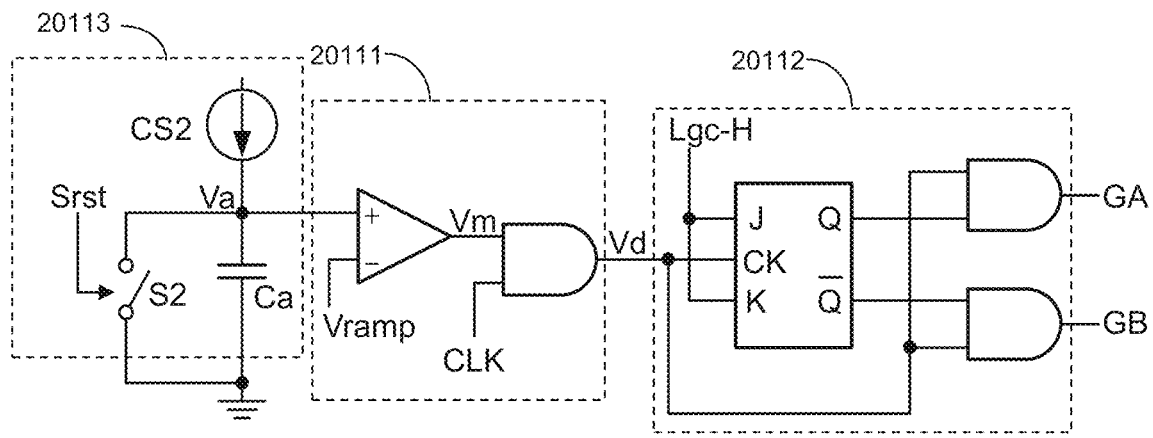
FIG. 4 shows a schematic circuit diagram of a control circuit of a resonant switching power converter circuit according to an embodiment of the present invention.
Figure 5A:
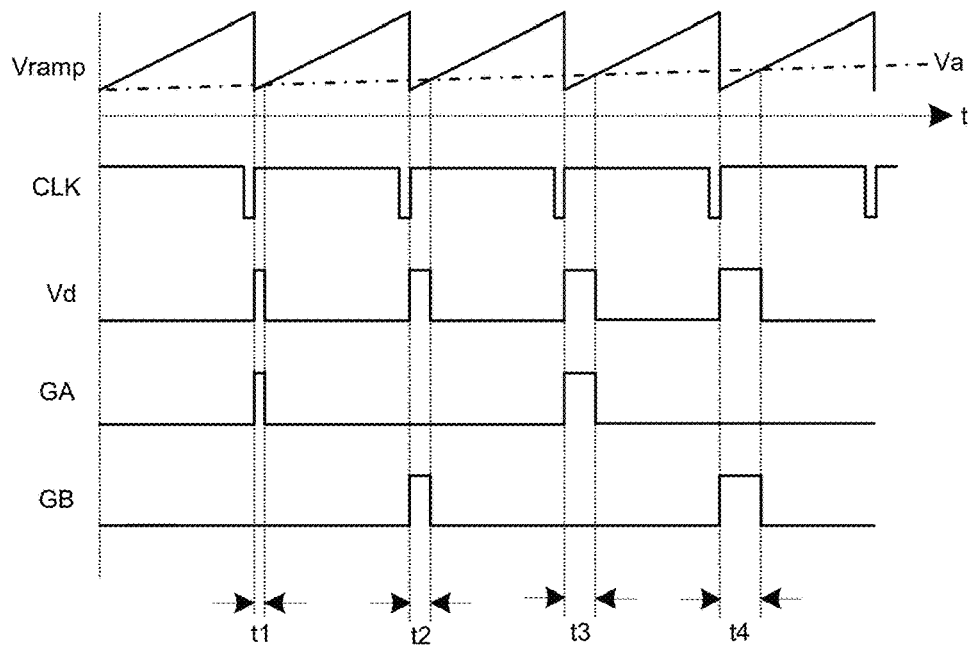
FIG. 5A shows a schematic diagram of waveforms of signals related to a start-up mode of a control circuit of a resonant switching power converter circuit according to an embodiment of the present invention.

FIG. 4 shows a schematic circuit diagram of a control circuit of a resonant switching power converter circuit according to an embodiment of the present invention. This embodiment shows an exemplary circuitry of the control circuit 2011; however, it should be understood that the present invention can be embodied by a different circuitry which still falls within the scope of the present invention. As shown in FIG. 4, in one embodiment, the control circuit 2011 includes a duty ratio determination circuit 20111, a duty ratio distribution circuit 20112 and a ramp-up voltage generation circuit 20113. The duty ratio determination circuit 20111 is configured to compare a ramp-up voltage Va with a periodic waveform signal Vramp to generate a duty ratio signal Vd, wherein the ramp-up voltage Va is generated by the ramp-up voltage generation circuit 20113 at a node between a current source CS2 and a capacitor Ca. The periodic waveform signal Vramp is for example but not limited to the triangular wave as shown in FIG. 5A. The duty ratio distribution circuit 20112 is configured to generate the first control signal GA and the at least one second control signal GB according to the duty ratio signal Vd. In one embodiment, as shown in FIG. 4, the duty ratio determination circuit 20111 includes a comparator and a logic gate; the duty ratio distribution circuit 20112 includes a flip-flop and logic gates; the ramp-up voltage generation circuit 20113 includes the current source CS2, the capacitor Ca and a reset switch S2.

In the start-up mode, the current source CS2 of the ramp-up voltage generation circuit 20113 charges the capacitor Ca, so that the ramp-up voltage Va at the node increases, whereby when the duty ratio determination circuit 20111 compares the ramp-up voltage Va with the periodic waveform signal Vramp to generate the duty ratio signal Vd, the duty ratio of the duty ratio signal Vd increases gradually, and therefore the duty ratios of the first control signal GA and the at least one second control signal GB correspondingly increase gradually, so that when the first power is converted to the second power or when the second power is converted to the first power, surge currents are reduced and soft start-up can be achieved.

In one embodiment, when the ramp-up voltage Va exceeds a maximum of the periodic waveform signal Vramp, the first control signal GA and the at least one second control signal GB which are generated by the duty ratio distribution circuit 20112 according to the duty ratio signal Vd can enter into the resonant voltage conversion mode. In one embodiment, after entering into the resonant voltage conversion mode, the duty ratio distribution circuit 20112 is shot down and the first control signal GA and the at least one second control signal GB are generated by other circuits. Besides, the ramp-up voltage generation circuit 20113 can turn ON the reset switch S2 at a proper timing (for example before the next start-up mode begins) according to a reset signal Srst, to discharge the capacitor Ca so as to reset the ramp-up voltage Va.

FIG. 5A shows a schematic diagram of waveforms of signals related to the start-up mode of the control circuit of a resonant switching power converter circuit according to an embodiment of the present invention. FIG. 5A shows the ramp-up voltage Va, the periodic waveform signal Vramp, a clock signal CLK, the duty ratio signal Vd, the first control signal GA and the second control signal GB. As shown in FIG. 5A, the ramp-up voltage Va increases gradually in the start-up mode; in the start-up mode, the ON periods t1~t4 increase gradually. In one embodiment, the duty ratio increases gradually, from 0% to 50%.

Figure 5B:
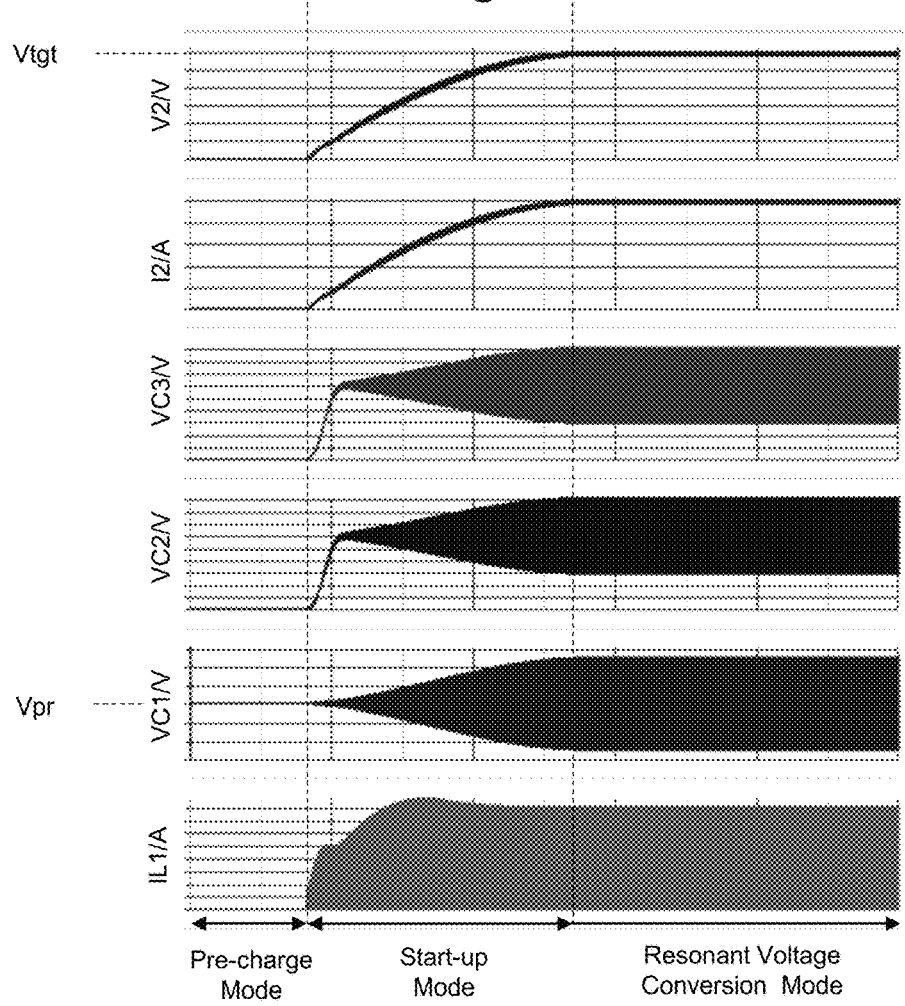
FIG. 5B shows a schematic diagram of waveforms of signals related to a start-up mode of a resonant switching power converter circuit according to an embodiment of the present invention.

FIG. 5B shows a schematic diagram of waveforms of signals related to a start-up mode of a resonant switching power converter circuit according to an embodiment of the present invention. FIG. 5B shows the second voltage V2, the second current I2, the voltage VC1 across the capacitor C1, the voltage VC2 across the capacitor C2, the voltage VC3 across the capacitor C3, and the inductor current IL1 of the inductor IL. FIG. 5B shows the resonant switching power converter circuit which has been through the pre-charge mode. As shown in FIG. 5B, when the resonant switching power converter circuit which has been through the pre-charge mode operates in the start-up mode and the resonant voltage conversion mode, by the gradually increasing time lengths of the ON periods, the surge currents can be further reduced.

Referring to FIG. 5B, in the pre-charge mode, for example, the aforementioned operation (4) is executed, wherein the control circuit 2011 turns ON the switch Q8, and controls the pre-charge switch circuit S1 of the pre-charge circuit 2012 by the pre-charge operation signal Gpr0, so as to charge the capacitor C1 to the second predetermined voltage Vpr, wherein the second predetermined voltage Vpr is for example two-fold of the target voltage Vtgt of the second voltage V2. Next, in the start-up mode, the figure shows that the second voltage V2 gradually increases to the target voltage Vtgt, and the switching ranges of the voltage VC1 across the capacitor C1, the voltage VC2 across the capacitor C2, the voltage VC3 across the capacitor C3 gradually become stable. In this embodiment, in the pre-charge mode before the start-up mode, the capacitor C1 is pre-charged to the second predetermined voltage Vpr, whereby the surge current and the ripple current in the output current (e.g., corresponding to the second current I2) are reduced.

Figure 6:
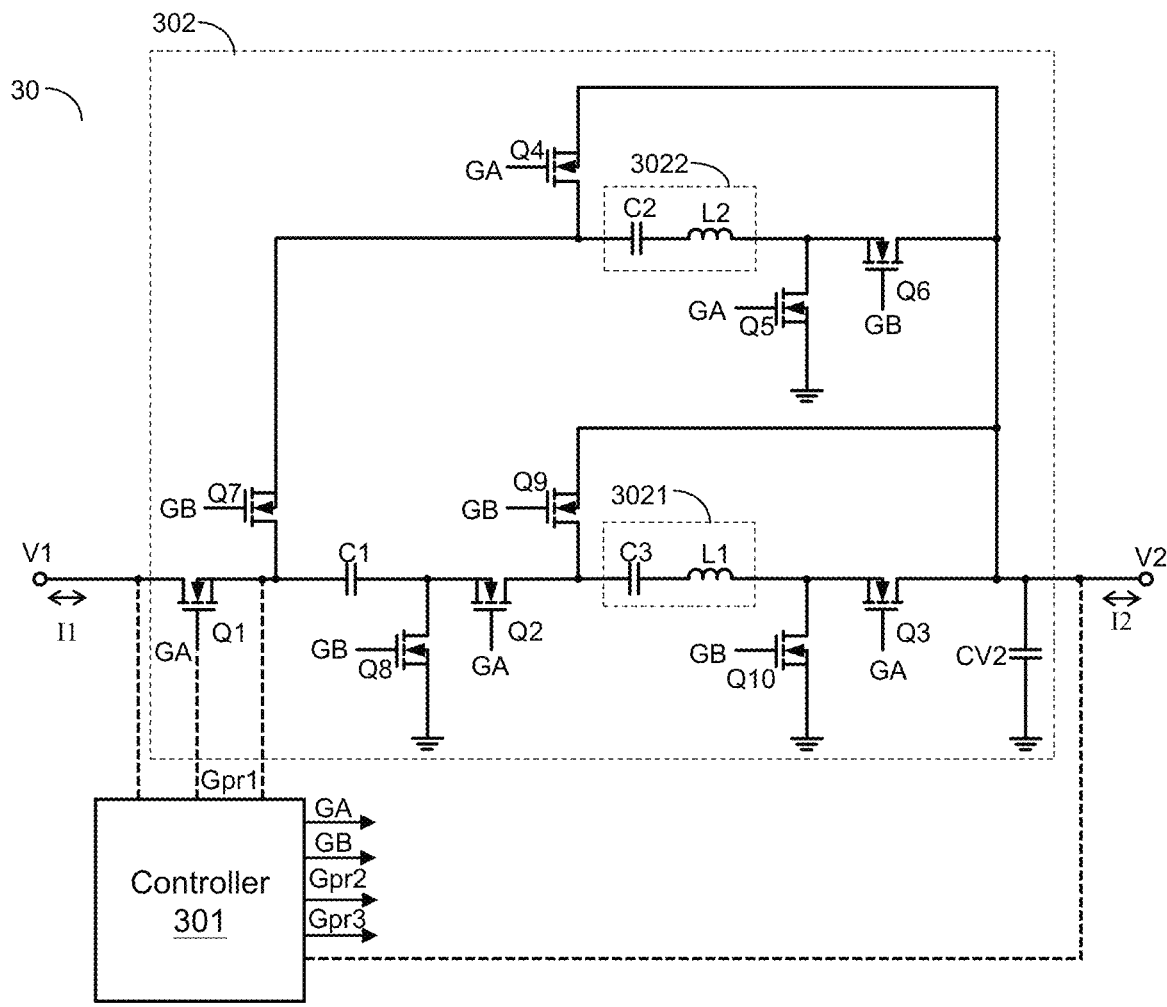
FIG. 6 shows a schematic circuit diagram of a resonant switching power converter circuit according to another embodiment of the present invention.

FIG. 6 illustrates a schematic circuit diagram of a resonant switching power converter circuit in accordance with another embodiment of the present invention. The switching converter 302 of this embodiment is similar to the switching converter 202 of the embodiment shown in FIG. 2, but is different in that: the inductor L1 of the switching converter 302 is directly electrically connected in series to the third capacitor (i.e., capacitor C3), so that the third capacitor (i.e., capacitor C3) and the inductor L1 constitutes a resonant tank 3021. The inductor L2 of the switching converter 302 is directly electrically connected in series to the second capacitor (i.e., capacitor C2), so that the second capacitor (i.e., capacitor C2) and the inductor L2 constitutes a resonant tank 3022. In one embodiment, during a first process, the switches Q1~Q10 are configured to operably control the resonant tank 3021 and the first capacitor (i.e., capacitor C1) to be electrically connected in series between the first power and the second power, and the switches Q1~Q10 are configured to operably control the resonant tank 3022 to be electrically connected in parallel to the second power. On the other hand, during a second process, the switches Q1~Q10 are configured to operably control the resonant tank 3022 and the first capacitor (i.e., capacitor C1) to be electrically connected in series between the second power and a ground voltage level, and the switches Q1~Q10 are configured to operably control the resonant tank 3021 to be electrically connected in parallel to the second power. The switching converter 302 executes power conversion between the first power and the second power through periodically conducting the above-mentioned operations in resonant fashion. In regard to operation details of the switches Q1~Q10, please refer to the embodiment shown in FIG. 2. The controller 301 of this embodiment can be implemented by employing the controller structure of FIGS. 3 and 4. Please refer to the detailed descriptions in regard to FIGS. 3 and 4.

Figure 7:
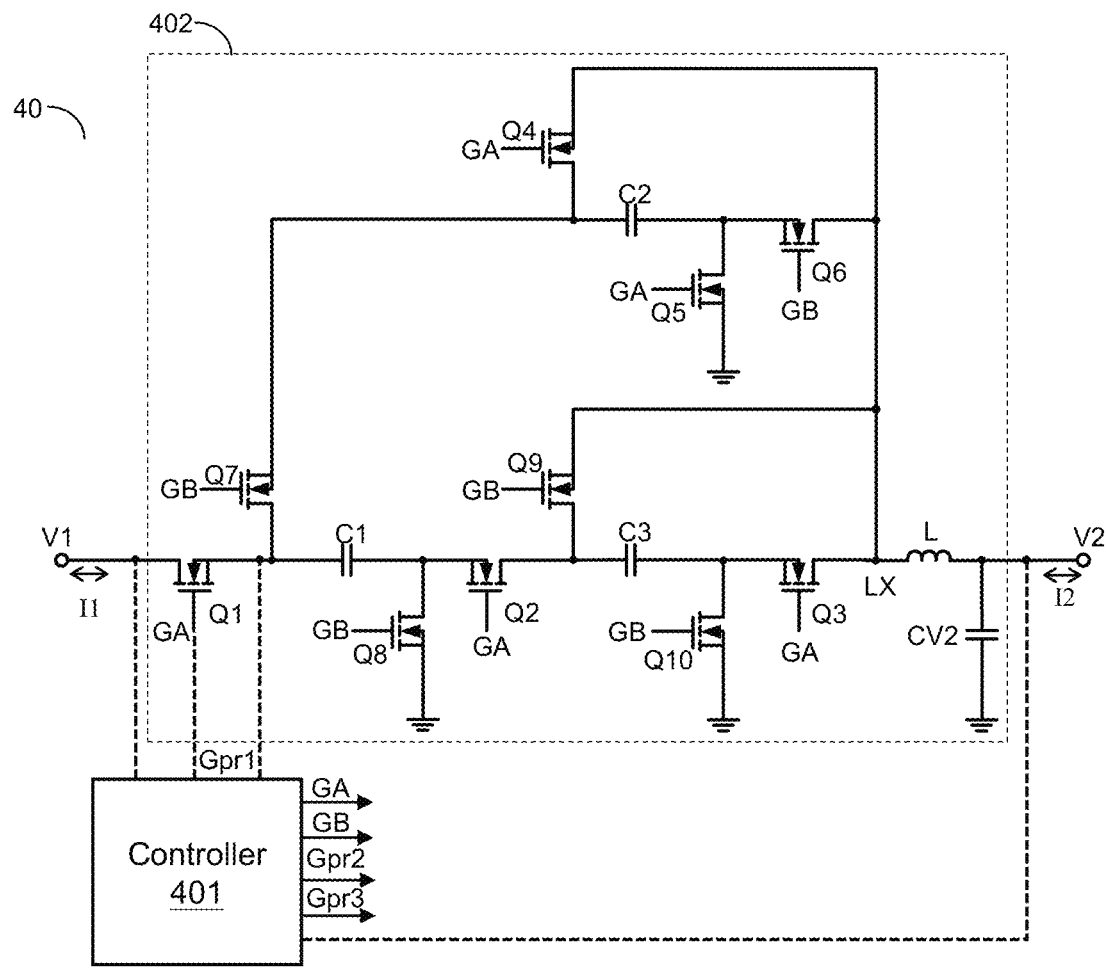
FIG. 7 shows a schematic circuit diagram of a resonant switching power converter circuit according to another embodiment of the present invention.

FIG. 7 illustrates a schematic circuit diagram of a resonant switching power converter circuit in accordance with still another embodiment of the present invention. The switching converter 402 of this embodiment is similar to the switching converter 202 of the embodiment shown in FIG. 2, but is different in that: the switching converter 402 shares an inductor L, and the inductor L is coupled between the second power and the switching node LX. During the first process, the switches Q1~Q10 control the first capacitor (i.e., capacitor C1) and the third capacitor (i.e., capacitor C3) to be electrically connected in series to the inductor L via the switching node LX, and the series circuit formed by the first capacitor (i.e., capacitor C1), the third capacitor (i.e., capacitor C3) and the inductor L is electrically connected in series between the first power and the second power, and the switches Q1~Q10 control the second capacitor (i.e., capacitor C2) to be electrically connected in series to the inductor L via the switching node LX, and the series circuit formed by the second capacitor (i.e., capacitor C2) and the inductor L is electrically connected in parallel to the second power. On the other hand, during the second process, the switches Q1~Q10 control the second capacitor (i.e., capacitor C2) and the first capacitor (i.e., capacitor C1) to be electrically connected in series to the inductor L via the switching node LX, and the series circuit formed by the second capacitor (i.e., capacitor C2), the first capacitor (i.e., capacitor C1) and the inductor L is electrically connected in series between the second power and the ground voltage level, and the switches Q1~Q10 control the third capacitor (i.e., capacitor C3) to be electrically connected in series to the inductor L via the switching node LX, and the series circuit formed by the third capacitor (i.e., capacitor C3) and the inductor L is electrically connected in parallel to the second power. In this embodiment, the first capacitor (i.e., capacitor C1), the second capacitor (i.e., capacitor C2), and the third capacitor (i.e., capacitor C3) operate together with the inductor L in resonant fashion to execute power conversion between the first power and the second power. In regard to operation details of the above-mentioned switches Q1~Q10, please refer to the embodiment shown in FIG. 2. The controller 401 of this embodiment can be implemented by employing the controller structure of FIGS. 3 and 4. Please refer to the detailed descriptions in regard to FIGS. 3 and 4.

It is worthwhile noting that, in this embodiment, the charging and discharging operations are executed in resonant fashion by a capacitor (or capacitors) in cooperation with an inductor. As a result, this embodiment can effectively reduce surge currents in the charging and discharging operations. Besides, this embodiment can achieve zero current switching or zero voltage switching in resonant fashion. The embodiments operating in resonant fashion which will be described later in the specification operate in the same way as this embodiment. The details will be explained later.

Figure 8:
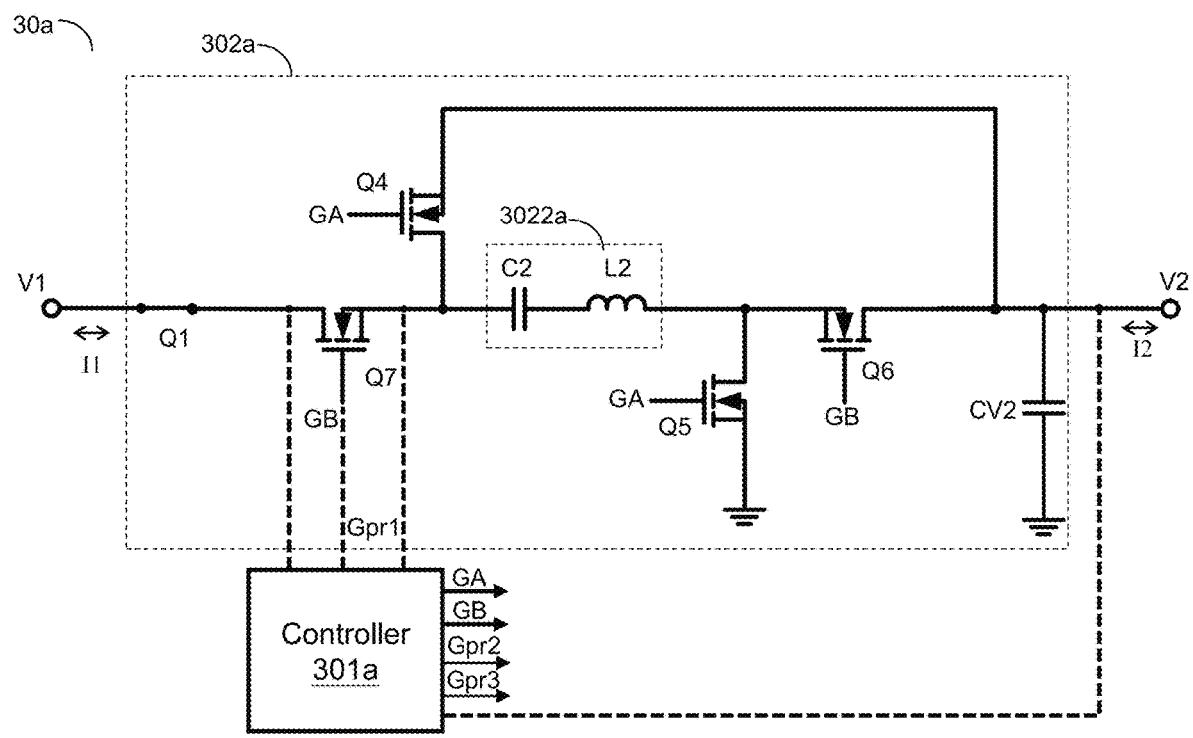
FIG. 8 shows a schematic circuit diagram of a resonant switching power converter circuit according to another embodiment of the present invention.

FIG. 8 illustrates a schematic circuit diagram of a resonant switching power converter circuit in accordance with yet another embodiment of the present invention. The switching converter 302a of FIG. 8 corresponds to the switching converter 302 of the embodiment shown in FIG. 6. To elaborate in more detail, in this embodiment, the switching converter 302a operates in a 2-fold conversion mode, wherein the switch Q1 is always ON (as shown by short circuit in FIG. 8), whereas, the switches Q2, Q3, and Q8~Q10 are always OFF. Besides, the switches Q4~Q7 are configured to operably switch the second capacitor (i.e., capacitor C2), so that during the first process, the second capacitor (i.e., capacitor C2) and the inductor L2 is electrically connected in series between the first power and the second power, and during the second process, the second capacitor (i.e., capacitor C2) and the inductor L2 form a series circuit which is electrically connected in parallel to the second power, such that a ratio of the first voltage V1 of the first power to the second voltage V2 of the second power is equal to 2. The second capacitor (i.e., capacitor C2) and the inductor L2 operate in resonant fashion to achieve power conversion between the first power and the second power. In this embodiment, because the switches Q2, Q3, and Q8~Q10 are always OFF, each of the resonant tank 3021a (which includes the third capacitor (i.e., capacitor C3) and the inductor L1) and the first capacitor (i.e., capacitor C1) has at least one end which is always floating. The controller 301a of this embodiment can be implemented by employing the controller structure of FIGS. 3 and 4. Please refer to the detailed descriptions in regard to FIGS. 3 and 4.

Figure 9:
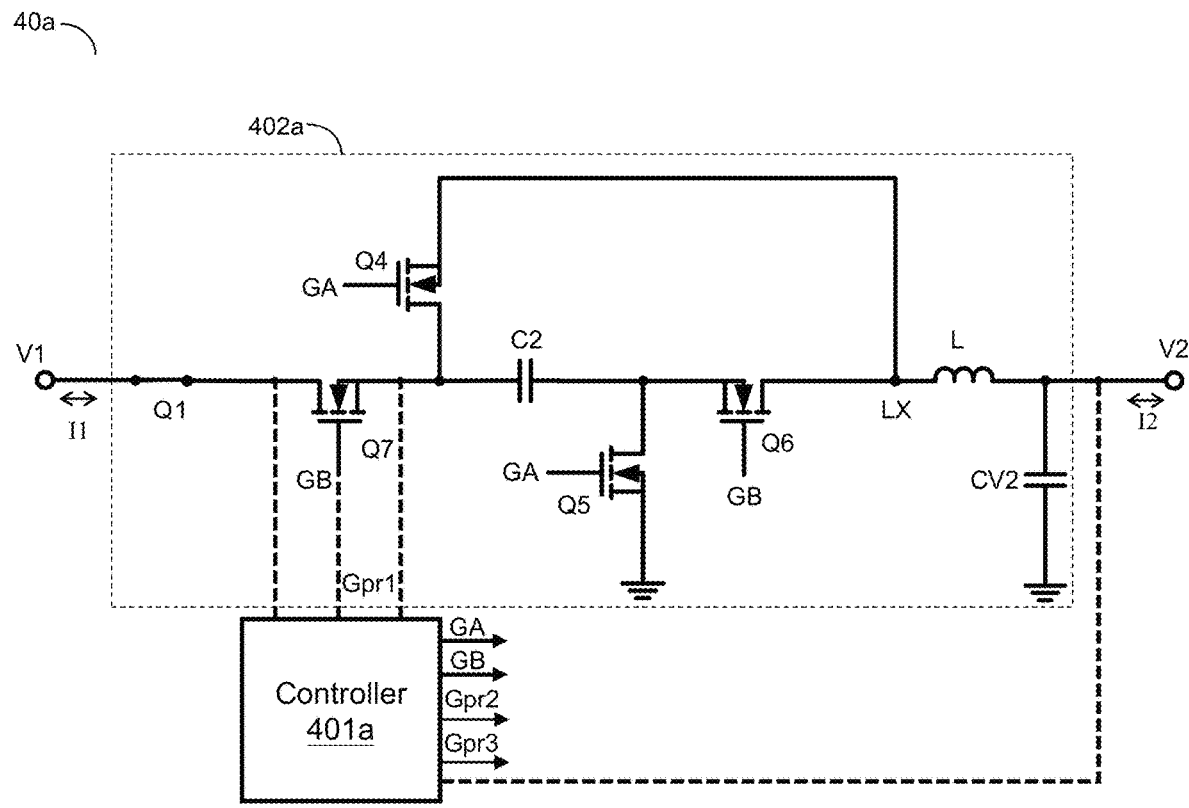
FIG. 9 shows a schematic circuit diagram of a resonant switching power converter circuit according to another embodiment of the present invention.

FIG. 9 illustrates a schematic circuit diagram of a resonant switching power converter circuit in accordance with still another embodiment of the present invention. The switching converter 402a of FIG. 9 corresponds to the switching converter 402 of the embodiment shown in FIG. 7. To elaborate in more detail, in this embodiment, the switching converter 402a operates in a 2-fold conversion mode, wherein the switch Q1 is always ON (as shown by short circuit in FIG. 9), whereas, the switches Q2, Q3, and Q8~Q10 are always OFF. Besides, the switches Q4~Q7 are configured to operably switch the second capacitor (i.e., capacitor C2), so that during the first process, the switches Q4~Q7 control the second capacitor (i.e., capacitor C2) to be electrically connected in series to the inductor L via the switching node LX, and the series circuit formed by the second capacitor (i.e., capacitor C2) and the inductor L is electrically connected in series between the first power and the second power, and during the second process, the switches Q4~Q7 control the second capacitor (i.e., capacitor C2) to be electrically connected in series to the inductor L via the switching node LX, and the series circuit formed by the second capacitor (i.e., capacitor C2) and the inductor L is electrically connected in parallel to the second power. In other words, during the second process, the switches Q4~Q7 control the second capacitor (i.e., capacitor C2) to be electrically connected in series to the inductor L via the switching node LX, and the series circuit formed by the second capacitor (i.e., capacitor C2) and the inductor L is connected between the second power and the ground voltage level, such that a ratio of the first voltage V1 of the first power to the second voltage V2 of the second power is equal to 2. The second capacitor (i.e., capacitor C2) and the inductor L operate in resonant fashion to achieve power conversion between the first power and the second power. In this embodiment, because the switches Q2, Q3, and Q8~Q10 are always OFF, each of the first capacitor (i.e., capacitor C1) and the third capacitor (i.e., capacitor C3) has at least one end which is always floating. The controller 401a of this embodiment can be implemented by employing the controller structure of FIGS. 3 and 4. Please refer to the detailed descriptions in regard to FIGS. 3 and 4.

Figure 10:
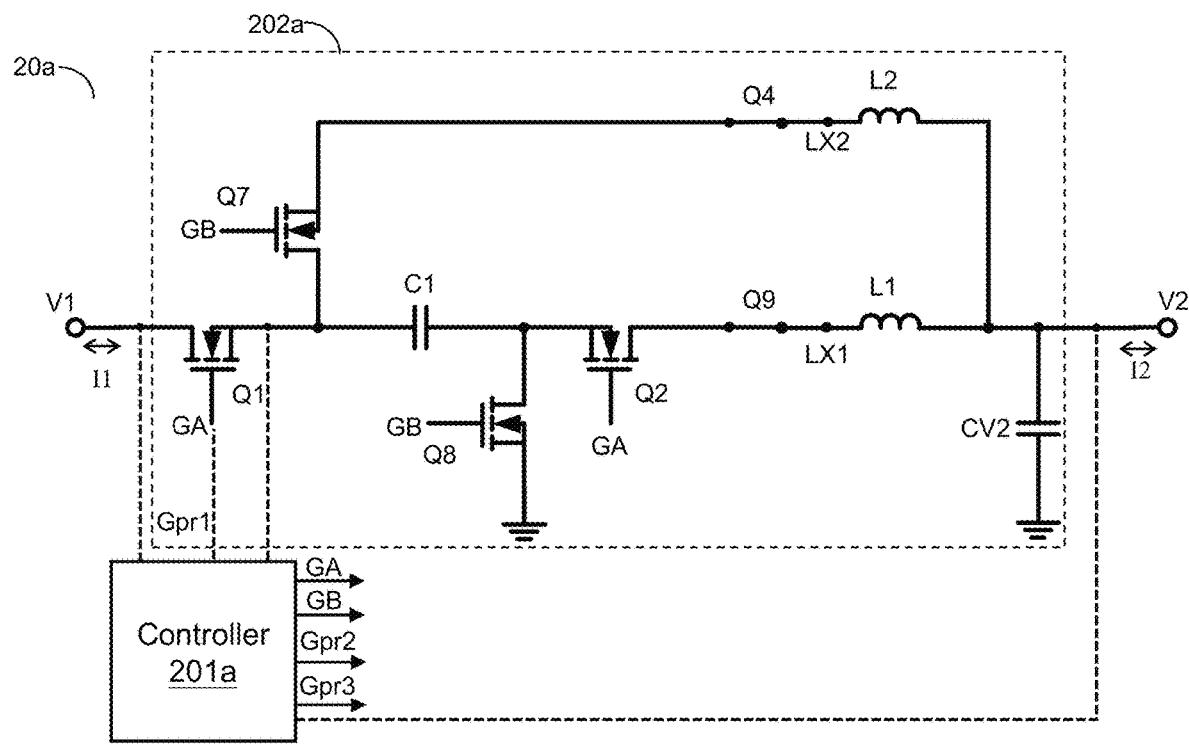
FIG. 10 shows a schematic circuit diagram of a resonant switching power converter circuit according to another embodiment of the present invention.

FIG. 10 illustrates a schematic circuit diagram of a resonant switching power converter circuit in accordance with yet another embodiment of the present invention. The switching converter 202a of FIG. 10 corresponds to the switching converter 202 of the embodiment shown in FIG. 2. To elaborate in more detail, in this embodiment, the switching converter 202a operates in a 2-fold conversion mode, wherein the switches Q4 and Q9 are always ON (as shown by short circuit in FIG. 10), whereas, the switches Q3, Q5, Q6, and Q10 are always OFF. Besides, the switches Q1, Q2, Q7, and Q8 are configured to operably switch the first capacitor (i.e., capacitor C1), so that during the first process, the switches Q1, Q2, Q7, and Q8 control the first capacitor (i.e., capacitor C1) to be electrically connected in series to the inductor L1 via the first switching node LX1, and the series circuit formed by the first capacitor (i.e., capacitor C1) and the inductor L1 is electrically connected in series between the first power and the second power, and during the second process, the switches Q1, Q2, Q7, and Q8 control the first capacitor (i.e., capacitor C1) to be electrically connected in series to the inductor L2 via the second switching node LX2, and the series circuit formed by the first capacitor (i.e., capacitor C1) and the inductor L2 is electrically connected in parallel to the second power. In other words, during the second process, the switches Q1, Q2, Q7, and Q8 control the first capacitor (i.e., capacitor C1) to be electrically connected in series to the inductor L2 via the second switching node LX2, and the series circuit formed by the first capacitor (i.e., capacitor C1) and the inductor L2 is connected between the second power and the ground voltage level, such that a ratio of the first voltage V1 of the first power to the second voltage V2 of the second power is equal to 2. The first capacitor (i.e., capacitor C1) and the inductors L1 and L2 operate in resonant fashion to achieve power conversion between the first power and the second power. In this embodiment, because the switches Q3, Q5, Q6, and Q10 are always OFF, each of the third capacitor (i.e., capacitor C3) and the second capacitor (i.e., capacitor C2) has at least one end which is always floating. The controller 201a of this embodiment can be implemented by employing the controller structure of FIGS. 3 and 4. Please refer to the detailed descriptions in regard to FIGS. 3 and 4.

Figure 11:
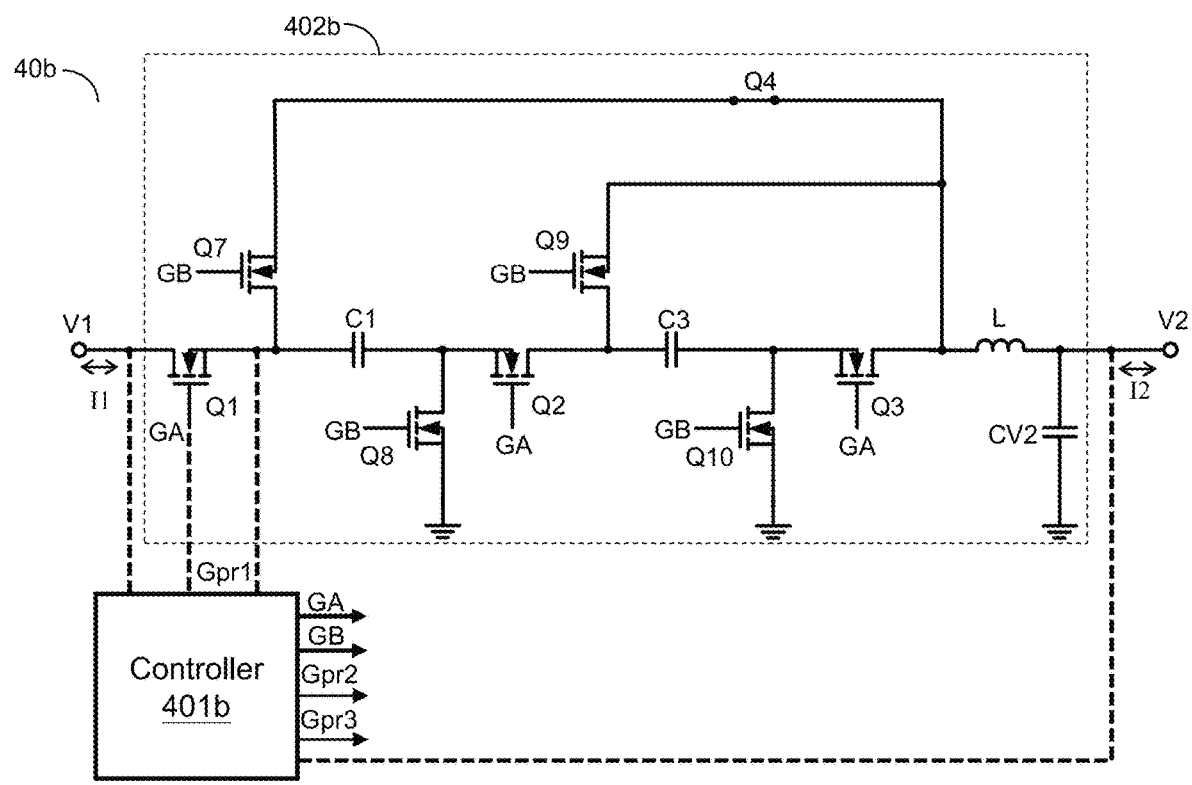
FIG. 11 shows a schematic circuit diagram of a resonant switching power converter circuit according to another embodiment of the present invention.

FIG. 11 illustrates a schematic circuit diagram of a resonant switching power converter circuit in accordance with still another embodiment of the present invention. The switching converter 402b of FIG. 11 corresponds to the switching converter 402 of the embodiment shown in FIG. 7. To elaborate in more detail, in this embodiment, the switching converter 402b operates in a 3-fold conversion mode, wherein the switch Q4 is always ON (as shown by short circuit in FIG. 11), whereas, the switches Q5 and Q6 are always OFF. Besides, the switches Q1~Q3 and Q7~Q10 are configured to operably switch the first capacitor (i.e., capacitor C1) and the third capacitor (i.e., capacitor C3), so that during the first process, the first capacitor (i.e., capacitor C1), the third capacitor (i.e., capacitor C3) and the inductor L are electrically connected in series between the first power and the second power, and during the second process, the first capacitor (i.e., capacitor C1) and the third capacitor (i.e., capacitor C3) form a parallel circuit which is electrically connected in series to the inductor L, and the series circuit formed by the inductor L with the parallel circuit is electrically connected in parallel to the second power, such that a ratio of the first voltage V1 of the first power to the second voltage V2 of the second power is equal to 3. The first capacitor (i.e., capacitor C1) and the third capacitor (i.e., capacitor C3) and the inductor L operate in resonant fashion to achieve power conversion between the first power and the second power. In this embodiment, because the switches Q5 and Q6 are always OFF, the second capacitor (i.e., capacitor C2) has one end which is always floating. The controller 401b of this embodiment can be implemented by employing the controller structure of FIGS. 3 and 4. Please refer to the detailed descriptions in regard to FIGS. 3 and 4.

Figure 12:
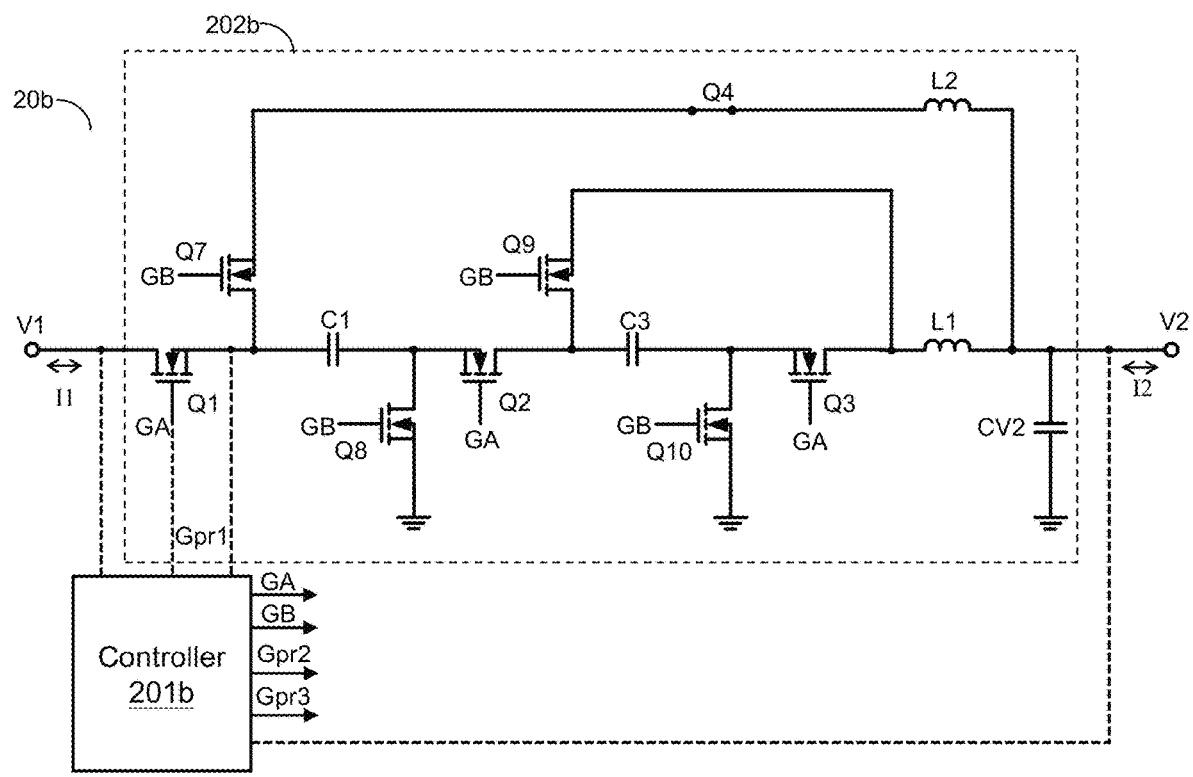
FIG. 12 shows a schematic circuit diagram of a resonant switching power converter circuit according to another embodiment of the present invention.

FIG. 12 illustrates a schematic circuit diagram of a resonant switching power converter circuit in accordance with yet another embodiment of the present invention. The switching converter 202b of FIG. 12 corresponds to the switching converter 202 of the embodiment shown in FIG. 2. And, the operation mechanism of the switches in the switching converter 202b shown in FIG. 12 is similar to the operation mechanism of the switches in the switching converter 402b shown in FIG. 11, but is different in that: during the first process, the first capacitor (i.e., capacitor C1), the third capacitor (i.e., capacitor C3) and the inductor L1 are electrically connected in series between the first power and the second power. On the other hand, during the second process, the third capacitor (i.e., capacitor C3) is electrically connected in series to the inductor L1 and the first capacitor (i.e., capacitor C1) is electrically connected in series to the inductor L2, and the series circuit formed by the third capacitor (i.e., capacitor C3) and the inductor L1 is electrically connected in parallel to the second power and the series circuit formed by the first capacitor (i.e., capacitor C1) and the inductor L2 is electrically connected in parallel to the second power, such that a ratio of the first voltage V1 of the first power to the second voltage V2 of the second power is equal to 3. In regard to operation details of the above-mentioned switches, please refer to the embodiment shown in FIG. 11. The controller 201b of this embodiment can be implemented by employing the controller structure of FIGS. 3 and 4. Please refer to the detailed descriptions in regard to FIGS. 3 and 4.

It is worthwhile noting that, the arrangement of switches and devices in the above-mentioned FIGS. 8-12 correspond to the arrangement of switches and devices in the above-mentioned FIG. 6, FIG. 7 and FIG. 2. That is, by keeping a part of the switches to be always ON and another part of the switches to be always OFF, and controlling a still other part of the switches to switch according the required conversion mode, the embodiments shown in the above-mentioned FIGS. 8-12 can achieve a desired ratio of the first voltage V1 of the first power to the second voltage V2 of the second power, which can be several different values. Note that FIGS. 8-12 show equivalent circuit diagrams corresponding to the embodiments shown in FIG. 6, FIG. 7 and FIG. 2, wherein for simplicity, the switches which are always OFF and the capacitors which are always floating are omitted.

Figure 13:
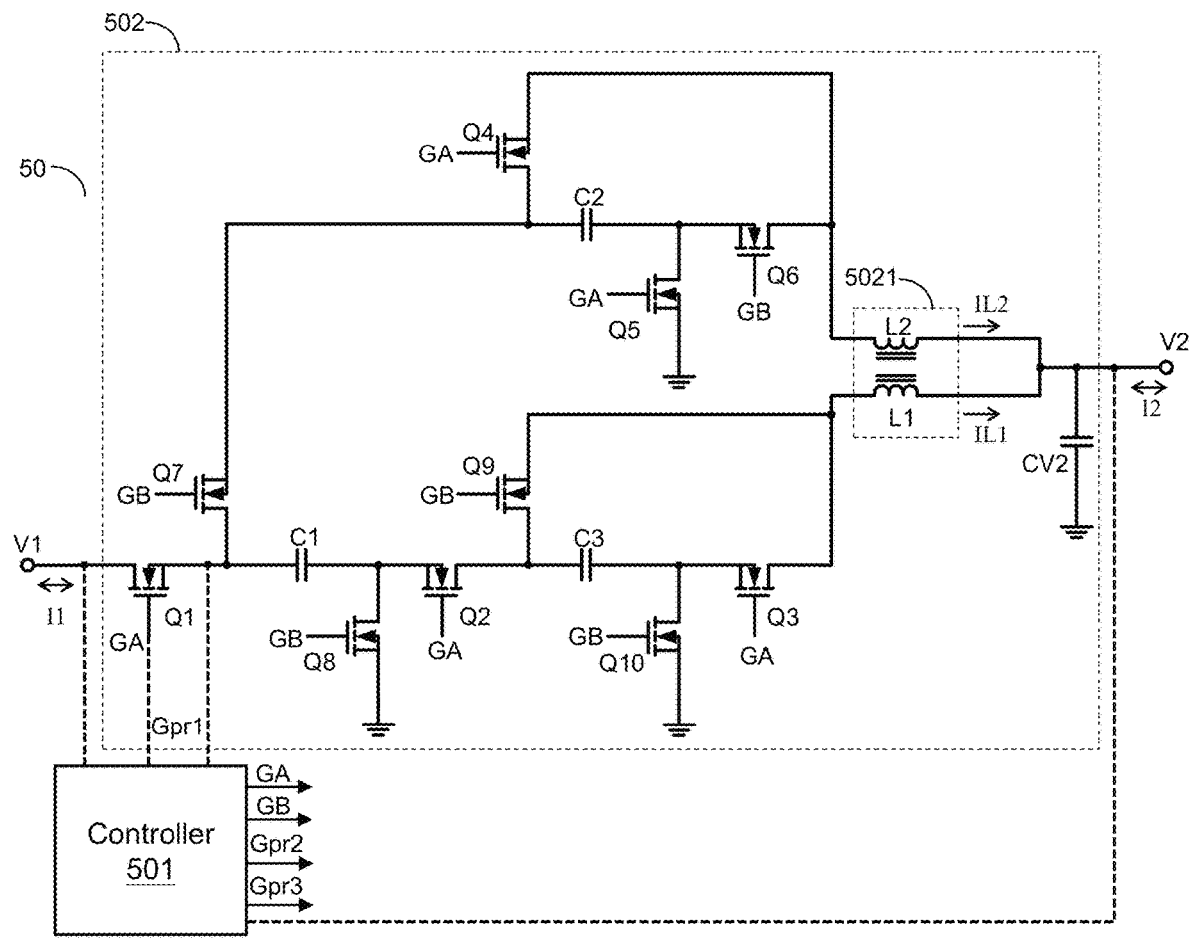
FIG. 13 shows a schematic circuit diagram of a resonant switching power converter circuit according to another embodiment of the present invention.

FIG. 13 illustrates a schematic circuit diagram of a resonant switching power converter circuit in accordance with still another embodiment of the present invention. The switching converter 502 of FIG. 13 is similar to the switching converter 202 of the embodiment shown in FIG. 2. In this embodiment, the inductor L1 and the inductor L2 of the switching converter 502 have coupled inductance (i.e. the inductances of interaction the inductor L1 and the inductor L2 interact with each other). As a consequence, there is better current balance between the inductor current IL1 and the inductor current IL2 of the switching converter 502 and also a better voltage balance between the capacitor C3 and the capacitor C2 of the switching converter 502. The controller 501 of this embodiment can be implemented by employing the controller structure of FIGS. 3 and 4. Please refer to the detailed descriptions in regard to FIGS. 3 and 4.

In one embodiment, the inductor L1 and the inductor L2 can be configured as coupled inductors or configured as a transformer (e.g., as shown by numerical reference 5021 in FIG. 13).

Figure 14:
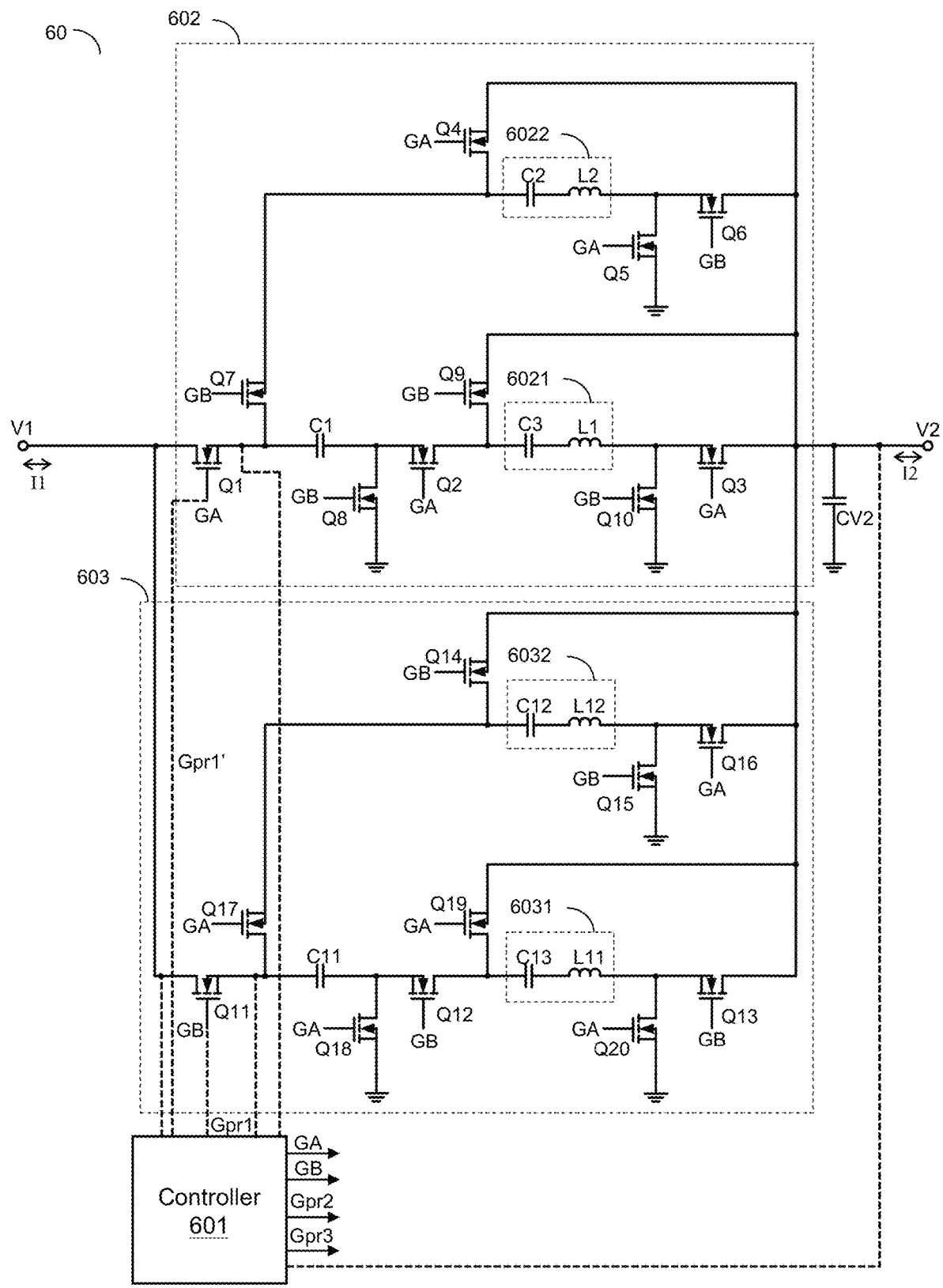
FIG. 14 shows a schematic circuit diagram of a resonant switching power converter circuit according to another embodiment of the present invention.

FIG. 14 illustrates a schematic circuit diagram of a resonant switching power converter circuit in accordance with yet another embodiment of the present invention. In one embodiment, the resonant switching power converter circuit 60 includes: a first switching converter 602 and a second switching converter 603. The first switching converter 602 and the second switching converter 603 are coupled in parallel between the first power and the second power. In this embodiment, the first switching converter 602 and the second switching converter 603 correspond to, for example, the switching converter 302 of the embodiment shown in FIG. 6. In this embodiment, through operation of the switching converters (i.e., the first switching converter 602 and the second switching converter 603) coupled in parallel to each other, this embodiment can increase the output power or can reduce the ripples. That the switching converters are "coupled in parallel" indicates that the input ends of the switching converters are both electrically connected to for example the first power, whereas, the output ends of the switching converters are both electrically connected to for example the second power.

In one embodiment, the first switching converter 602 and the second switching converter 603 are configured to respectively control the switches therein in opposite phases, to execute power conversion in an alternating fashion. To elaborate in more detail, in this embodiment, as shown in FIG. 14, control signals GA and GB for controlling the switches Q1~Q10 of the first switching converter 602 are in phase with the control signals GA and GB for controlling the switches Q1~Q10 of the switching converter 302 of the embodiment shown in FIG. 6, whereas, control signals GA and GB for controlling the switches Q11~Q20 of the second switching converter 603 are in opposite phase with the control signals GA and GB for controlling the switches Q1~Q10 of the switching converter 302 of the embodiment shown in FIG. 6 (i.e., the control signals GA and GB for controlling the switches Q11~Q20 of the second switching converter 603 are in opposite phase with the control signals GA and GB for controlling the switches Q1~Q10 of the first switching converter 602).

The first switching converter 602 and the second switching converter 603 include: an inductor L1, an inductor L2, an inductor L11 and an inductor L12, which are electrically connected in series to a capacitor C3, a capacitor C2, a capacitor C13 and a capacitor C12, respectively, so as to constitute a resonant tank 6021, a resonant tank 6022, a resonant tank 6031 and a resonant tank 6032, respectively. The resonant switching power converter circuit 60 of this embodiment operates the first switching converter 602 and the second switching converter 603 in an alternating fashion, so as to execute power conversion in an alternating fashion. Each of the first switching converter 602 and the second switching converter 603 is similar to the switching converter 302 of the embodiment shown in FIG. 6, to execute power conversion in resonant fashion. The controller 601 of this embodiment can be implemented by employing the controller structure of FIGS. 3 and 4. Please refer to the detailed descriptions in regard to FIGS. 3 and 4. As shown in FIG. 14, the controller 601 of this embodiment is coupled to the first power, the second power, the first switch (i.e., the switch Q1 and the switch Q11), a node between the first switch and the seventh switch (i.e., a node between the switch Q1 and the switch Q7 and a node between the switch Q11 and the switch Q17).

Figure 15:
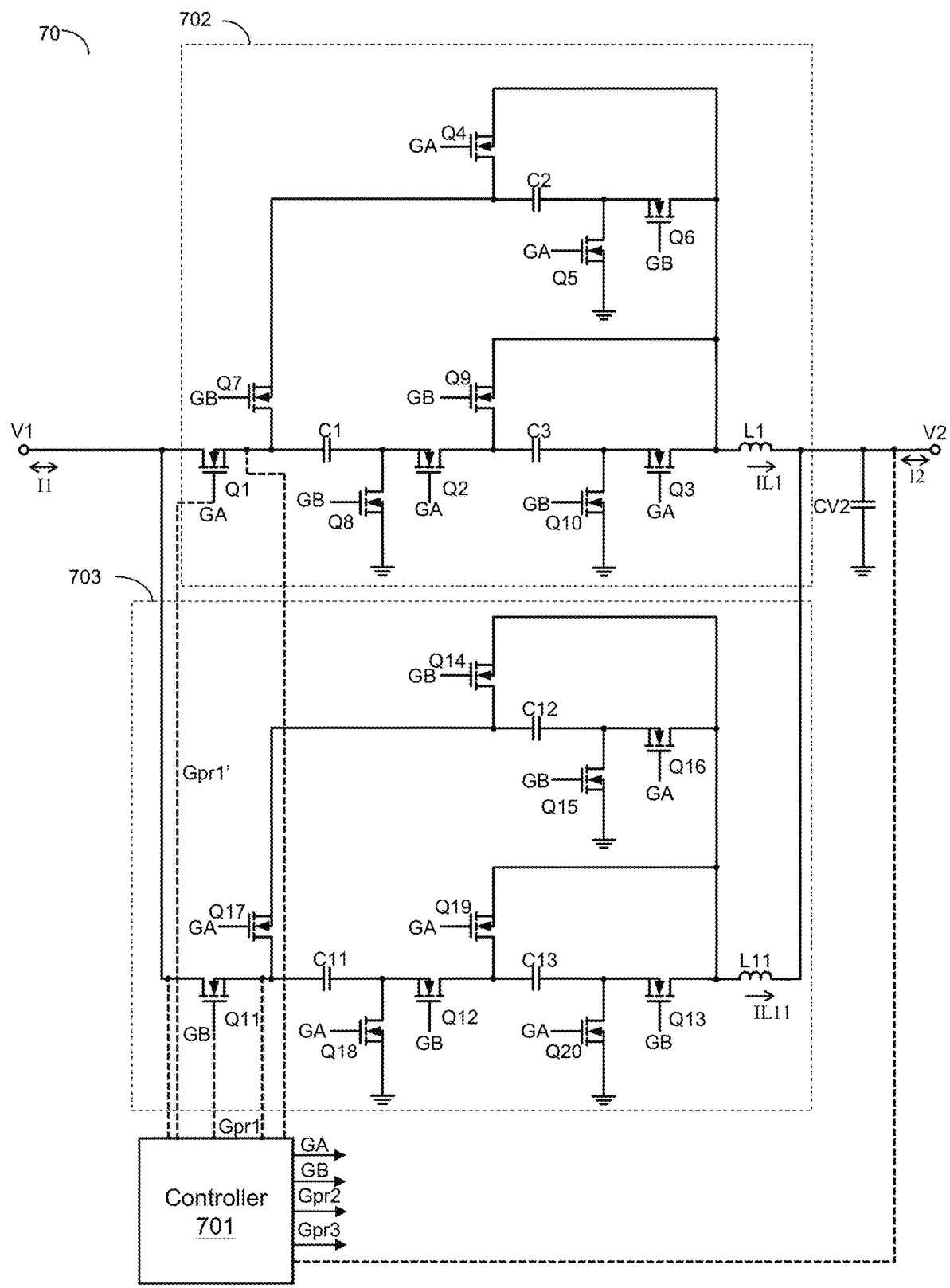
FIG. 15 shows a schematic circuit diagram of a resonant switching power converter circuit according to another embodiment of the present invention.

FIG. 15 illustrates a schematic circuit diagram of a resonant switching power converter circuit in accordance with still another embodiment of the present invention. The resonant switching power converter circuit 70 of FIG. 15 is similar to the resonant switching power converter circuit 60 of the embodiment shown in FIG. 14 (i.e., the resonant switching power converter circuit 70 includes a first switching converter 702 and a second switching converter 703), but is different in that: the first switching converter 702 shares an inductor L1 while the second switching converter 703 shares an inductor L11. The capacitor C3 and the capacitor C2 form a parallel circuit which is electrically connected in series to the inductor L1 in a way similar to the embodiment shown in FIG. 7. The capacitor C13 and the capacitor C12 form a parallel circuit which is electrically connected in series to the inductor L11 in a way similar to the embodiment shown in FIG. 7. Similar to the resonant switching power converter circuit 60 of the embodiment shown in FIG. 14, the resonant switching power converter circuit 70 of this embodiment operates the first switching converter 702 and the second switching converter 703 in an alternating fashion, so as to execute power conversion in an alternating fashion. Each of the first switching converter 702 and the second switching converter 703 is similar to the switching converter 402 of the embodiment shown in FIG. 7, to execute power conversion in resonant fashion. The controller 701 of this embodiment can be implemented by employing the controller structure of FIGS. 3 and 4. Please refer to the detailed descriptions in regard to FIGS. 3 and 4. As shown in FIG. 15, the controller 701 of this embodiment is coupled to the first power, the second power, the first switch (i.e., the switch Q1 and the switch Q11), a node between the first switch and the seventh switch (i.e., a node between the switch Q1 and the switch Q7 and a node between the switch Q11 and the switch Q17).

Figure 16:
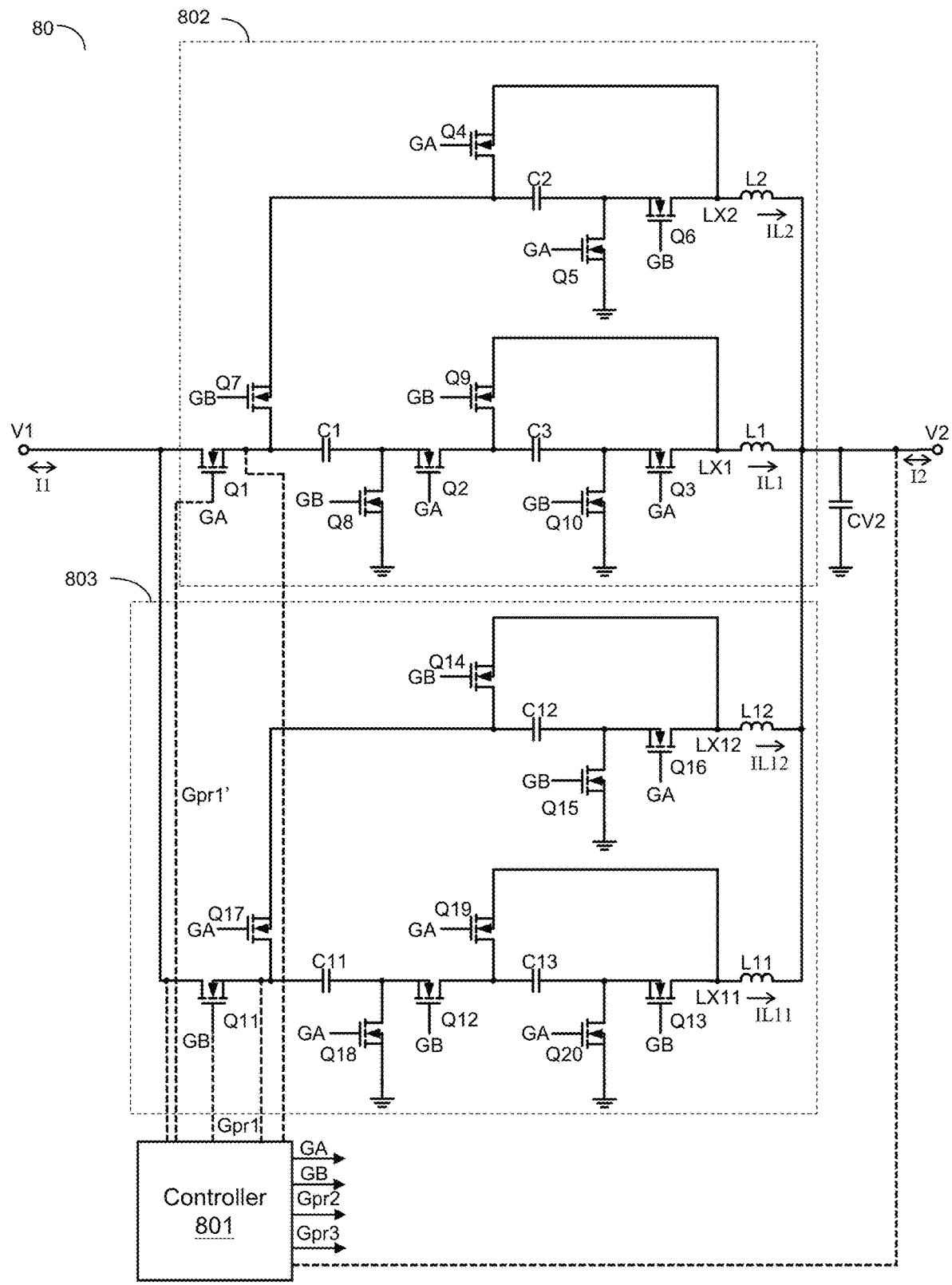
FIG. 16 shows a schematic circuit diagram of a resonant switching power converter circuit according to another embodiment of the present invention.

FIG. 16 illustrates a schematic circuit diagram of a resonant switching power converter circuit in accordance with yet another embodiment of the present invention. The resonant switching power converter circuit 80 of FIG. 16 is similar to the resonant switching power converter circuit 60 of the embodiment shown in FIG. 14 (i.e., the resonant switching power converter circuit 80 includes a first switching converter 802 and a second switching converter 803), but is different in that: an inductor L1, an inductor L2, an inductor L11 and an inductor L12 of the first switching converter 802 and the second switching converter 803 are not directly connected in series to a capacitor C3, a capacitor C2, a capacitor C13 and a capacitor C12, respectively, but are connected in series to the capacitor C3, the capacitor C2, the capacitor C13 and the capacitor C12 via the first switching node LX1, the second switching node LX2, the first switching node LX11 and the second switching node LX12, respectively. Similar to the resonant switching power converter circuit 60 of the embodiment shown in FIG. 14, the resonant switching power converter circuit 80 of FIG. 16 operates the first switching converter 802 and the second switching converter 803 in an alternating fashion, so as to execute power conversion in an alternating fashion. Each of the first switching converter 802 and the second switching converter 803 is similar to the switching converter 202 of the embodiment shown in FIG. 2, to execute power conversion in resonant fashion. The controller 801 of this embodiment can be implemented by employing the controller structure of FIGS. 3 and 4. Please refer to the detailed descriptions in regard to FIGS. 3 and 4. As shown in FIG. 16, the controller 801 of this embodiment is coupled to the first power, the second power, the first switch (i.e., the switch Q1 and the switch Q11), a node between the first switch and the seventh switch (i.e., a node between the switch Q1 and the switch Q7 and a node between the switch Q11 and the switch Q17).

Figure 17:
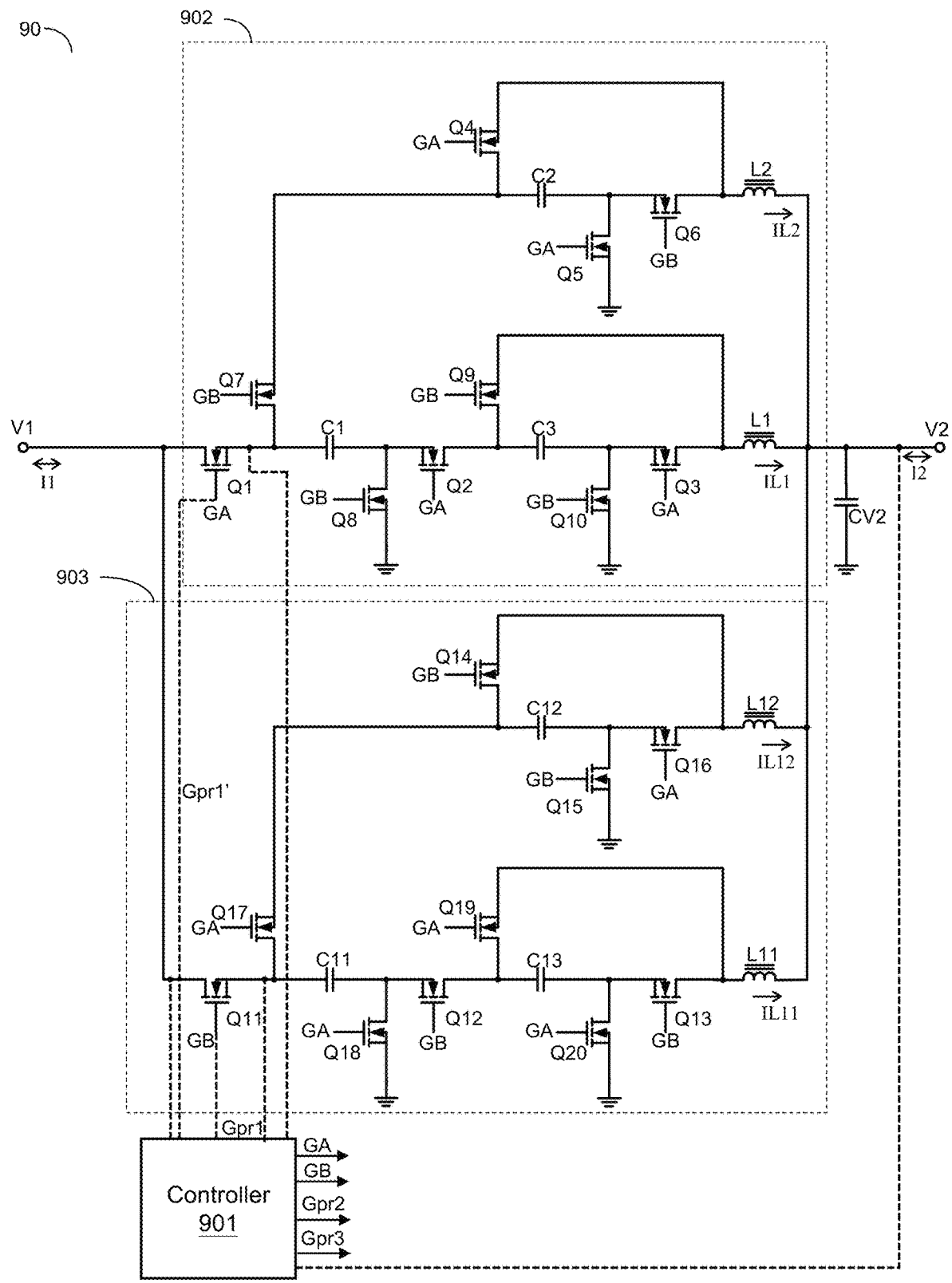
FIG. 17 shows a schematic circuit diagram of a resonant switching power converter circuit according to another embodiment of the present invention.

FIG. 17 illustrates a schematic circuit diagram of a resonant switching power converter circuit in accordance with still another embodiment of the present invention. The resonant switching power converter circuit 90 of FIG. 17 is similar to the resonant switching power converter circuit 80 of the embodiment shown in FIG. 16. An inductor L1, an inductor L2, an inductor L11 and an inductor L12 of the resonant switching power converter circuit 90 have coupled inductance among one another. As a consequence, there is better current balance among an inductor current IL1, an inductor current IL2, an inductor current IL11 and an inductor current IL12 of the resonant switching power converter circuit 90, and better voltage balance among a capacitor C3 a capacitor C2, a capacitor C13 and a capacitor C12 of the resonant switching power converter circuit 90. In one embodiment, depending upon practical consideration, it can be arranged so that all four of the inductor L1, the inductor L2, the inductor L11 and the inductor L12 of the resonant switching power converter circuit 90 have coupled inductance among one another or just a part of the above-mentioned four inductors have coupled inductance among one another. In one embodiment, the inductor L1, the inductor L2, the inductor L11 and the inductor L12 can be configured as at least one transformer. The controller 901 of this embodiment can be implemented by employing the controller structure of FIGS. 3 and 4. Please refer to the detailed descriptions in regard to FIGS. 3 and 4. As shown in FIG. 17, the controller 901 of this embodiment is coupled to the first power, the second power, the first switch (i.e., the switch Q1 and the switch Q11), a node between the first switch and the seventh switch (i.e., a node between the switch Q1 and the switch Q7 and a node between the switch Q11 and the switch Q17).

Figure 18A:
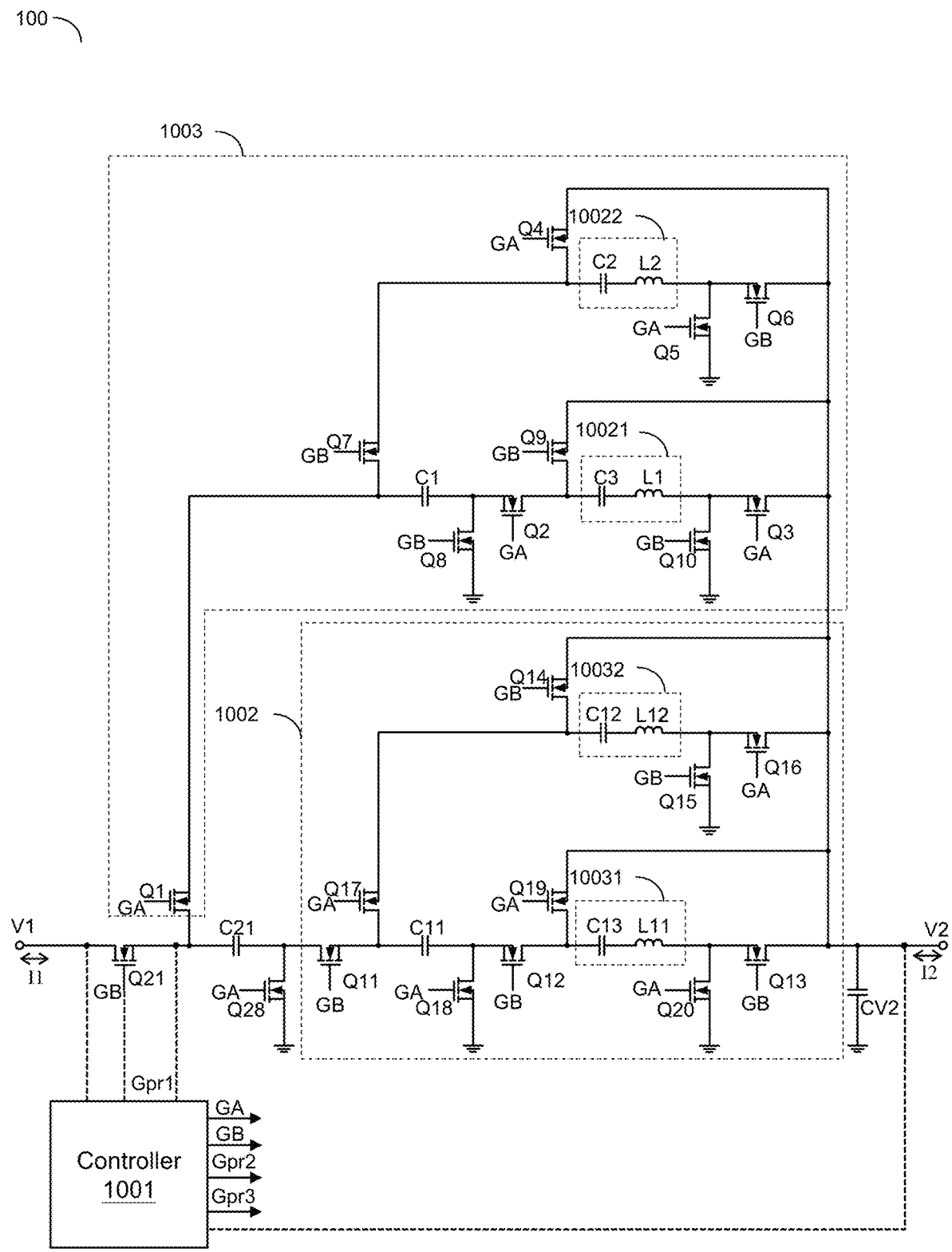
FIG. 18A shows a schematic circuit diagram of a resonant switching power converter circuit according to another embodiment of the present invention.

FIG. 18A illustrates a schematic circuit diagram of a resonant switching power converter circuit in accordance with yet another embodiment of the present invention. The resonant switching power converter circuit 100 shown in FIG. 18A includes: a first switching converter 1002, a second switching converter 1003, an upper layer capacitor (i.e., capacitor C21) and upper layer switches (i.e., switches Q21 and Q28). The first switching converter 1002 and the second switching converter 1003 correspond to, for example, the switching converter 302 of the embodiment shown in FIG. 6. From one perspective, the resonant switching power converter circuit 100 shown in FIG. 18A is a multi-layer structure based on a basic configuration of the switching converter 302 shown in FIG. 6. To elaborate in more detail, in this embodiment, the upper layer capacitor (i.e., capacitor C21), the upper layer switches (i.e., switches Q21 and Q28), the first switching converter 1002 and the second switching converter 1003 are coupled to one another according to a fundamental topology. Please refer to FIG. 18B, the "fundamental topology" refers to a structure unit including the upper layer capacitor (i.e., capacitor C21), the upper layer switches (i.e., switches Q21 and Q28), the first switching converter 1002 and the second switching converter 1003, and the coupling relationships among them. The details thereof will be described later. The controller 1001 of this embodiment can be implemented by employing the controller structure of FIGS. 3 and 4. Please refer to the detailed descriptions in regard to FIGS. 3 and 4. As shown in FIG. 18A, in one embodiment, during the pre-charging mode, the switch turned off by the controller 1001 is the upper layer switch (i.e., switch Q21). In other words, the controller 1001 of this embodiment is coupled to the first power, the second power, the upper layer switch (i.e., switch Q21), a node between the upper layer switch (i.e., switch Q21) and the first switch (i.e., switch Q1) of the second switching converter 1003.

Figure 18B:
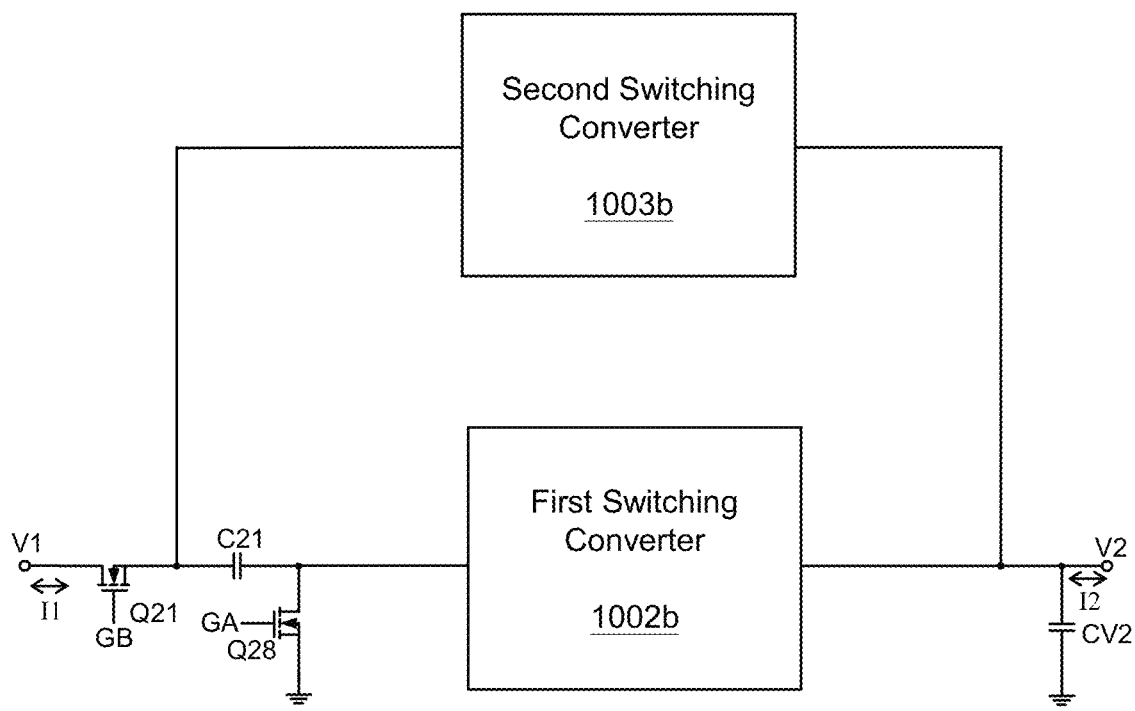
FIG. 18B shows a schematic block circuit diagram of a resonant switching power converter circuit according to another embodiment of the present invention.

In one embodiment, based upon the above-mentioned fundamental topology, an input end of the first switching converter 1002 (corresponding to the first switching converter 1002b shown in FIG. 18B) is electrically connected to one end of the upper layer capacitor (i.e., capacitor C21), whereas, an input end of the second switching converter 1003 (corresponding to the second switching converter 1003b shown in FIG. 18B) is electrically connected to the other end of the upper layer capacitor (i.e., capacitor C21). Besides, an output end of the first switching converter 1002 and an output end of the second switching converter 1003 are both electrically connected to the second power.

During a first process (e.g., corresponding to a period wherein the control signal GA is in enable state while the control signal GB is in disable state), the upper layer switches (i.e., switches Q21 and Q28) and the switches (e.g., Q11~Q20) of the first switching converter 1002 control the upper layer capacitor (i.e., capacitor C21) to be electrically connected in series to the first switching converter 1002, so that at least one current path is formed between the first power and the second power, and the upper layer switches (i.e., switches Q21 and Q28) and the switches (e.g., Q1~Q10) of the second switching converter 1003 control the upper layer capacitor (i.e., capacitor C21) to be disconnected from the second switching converter 1003, and the upper layer switches (i.e., switches Q21 and Q28) and the switches (e.g., Q1~Q10) of the second switching converter 1003 control the second switching converter 1003 to form at least one current path between the second power and a ground voltage level.

On the other hand, during a second process (e.g., corresponding to a period wherein the control signal GA is in disable state while the control signal GB is in enable state), the upper layer switches (i.e., switches Q21 and Q28) and the switches (e.g., Q1~Q10) of the second switching converter 1003 control the second switching converter 1003 and the upper layer capacitor (i.e., capacitor C21) to be electrically connected in series between the second power and the ground voltage level, so that at least one current path is formed between the second power and the ground voltage level, and the upper layer switches (i.e., switches Q21 and Q28) and the switches (e.g., Q11~Q20) of the first switching converter 1002 control the upper layer capacitor (i.e., capacitor C21) to be disconnected from the first switching converter 1002, and the upper layer switches (i.e., switches Q21 and Q28) and the switches (e.g., Q11~Q20) of the first switching converter 1002 control the first switching converter 1002 to form at least one current path between the second power and the ground voltage level.

The above-mentioned current path refers to a current path formed by conductive switches corresponding to the control signal GA or the control signal GB which is in enable state.

The first switching converter 1002 and the second switching converter 1003 are equipped with the resonant tanks shown in the embodiment of FIG. 6, i.e. resonant tanks 10021, 10022, 10031 and 10032, to achieve power conversion between the first power and the second power by means of the resonant tanks 10021, 10022, 10031 and 10032 in resonant fashion.

In this embodiment of FIG. 18A, a ratio of the first voltage V1 of the first power to the second voltage V2 of the second power is equal to 8. To be more specific, in a steady state, the voltage across the capacitor C21 is equal to 4*V2; the voltage across the capacitor C1 and the voltage across the capacitor C11 (both C1 and C11 correspond to the first capacitor in the aforementioned embodiment) are equal to 2*V2; the voltage across the capacitor C3, the voltage across the capacitor C13 (both C3 and C13 correspond to the third capacitor in the aforementioned embodiment), the voltage across the capacitor C2 and the voltage across the capacitor C12 (both C2 and C22 correspond to the second capacitor in the aforementioned embodiment) are equal to V2.

Please refer to FIG. 18B. The present invention can recursively expand layers of the pipeline resonant switching power converter circuit based on the fundamental topology shown in FIG. 18B, so as to achieve higher scaling factor of conversion between the first voltage and the second voltage. As shown in FIG. 18B, any pipeline resonant switching power converter circuit complying with the fundamental topology shown in FIG. 18B can be employed to replace the first switching converter 1002 and the second switching converter 1003 (e.g., each of the first switching converter 1002b and the second switching converter 1003b can be an N-layers pipeline resonant switching power converter circuit shown in FIG. 18B, wherein N is an integer greater than or equal to two), so that the pipeline resonant switching power converter circuit have even more layers. That is, under such situation, the pipeline resonant switching power converter circuit 100b will become a pipeline resonant switching power converter circuit having (N+1) layers.

As an example, assumed that the first switching converter 1002b and the second switching converter 1003b shown in FIG. 18B are each replaced by a pipeline resonant switching power converter circuit 100 shown in FIG. 18A, then the pipeline resonant switching power converter circuit 100b shown in FIG. 18B will become a pipeline resonant switching power converter circuit having a conversion ratio of 16:1. Repeating such replacement recursively, the conversion ratio can be increased even more (e.g., by replacing each of the first switching converter 1002b and the second switching converter 1003b shown in FIG. 18B by a pipeline resonant switching power converter circuit having a conversion ratio of 16:1, the conversion ration becomes 32:1, and so on).

In this embodiment (i.e., a pipeline resonant switching power converter circuit having a ratio of 16:1), the first switching converter 1002 and the second switching converter 1003 shown in FIG. 18A are regarded as a bottom layer (which is the first layer) of the pipeline resonant switching power converter circuit, which has a configuration corresponding to, for example, the switching converter 302 of the embodiment shown in FIG. 6; the pipeline resonant switching power converter circuit 100 shown in FIG. 18A can be regarded as a 2-layers pipeline resonant switching power converter circuit; if each of the first switching converter 1002b and the second switching converter 1003b shown in FIG. 18B is replaced by a 2-layers pipeline resonant switching power converter circuit 100 shown in FIG. 18A, then the pipeline resonant switching power converter circuit 100b shown in FIG. 18B will become a 3-layers pipeline resonant switching power converter circuit.

Figure 19:
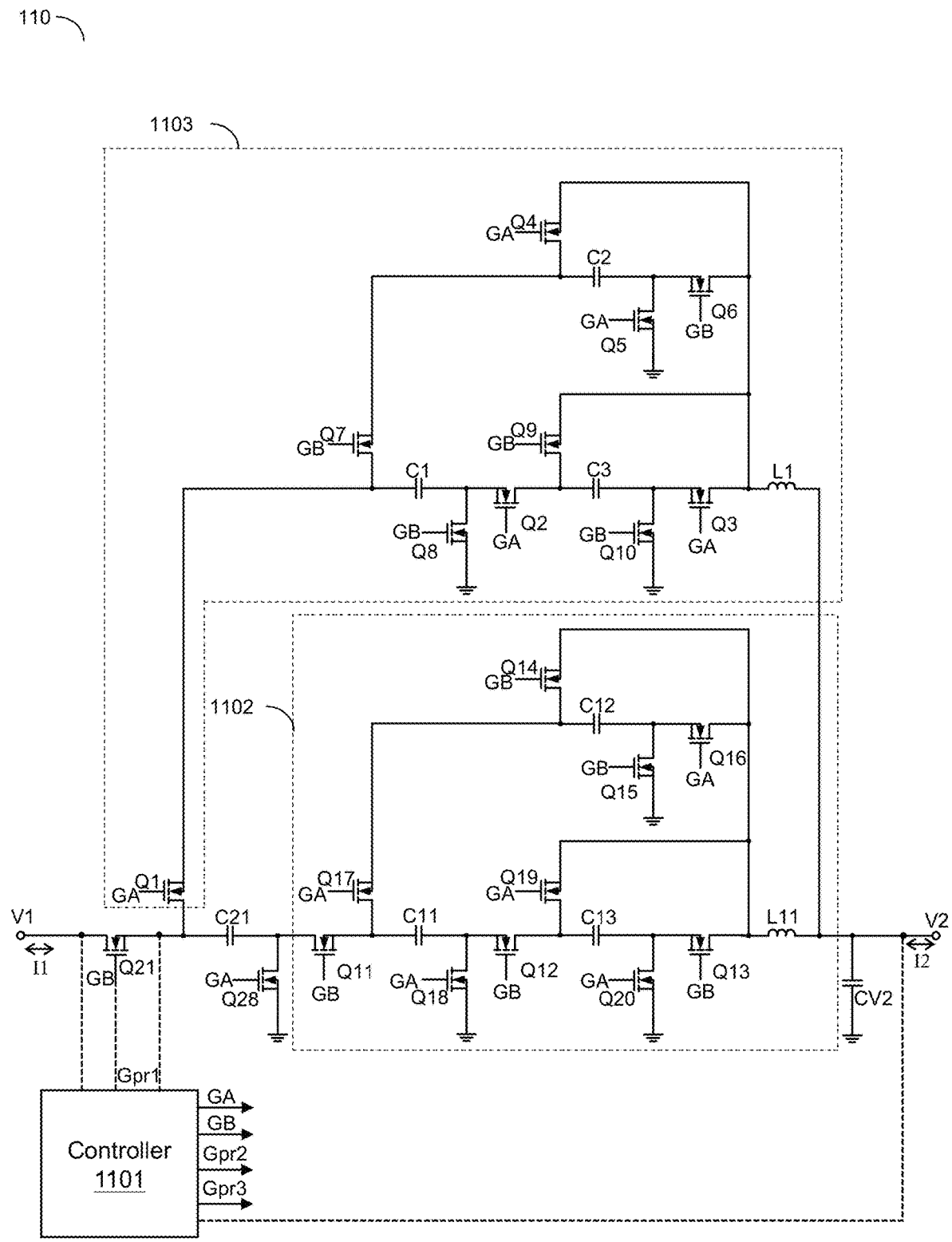
FIG. 19 shows a schematic circuit diagram of a resonant switching power converter circuit according to another embodiment of the present invention.

FIG. 19 shows a schematic circuit diagram of a resonant switching power converter circuit according to another embodiment of the present invention. The resonant switching power converter circuit 110 shown in FIG. 19 is similar to the resonant switching power converter circuit 100 shown in FIG. 18, but is different in that: the first switching converter 1102 shares an inductor L11, and the second switching converter 1103 shares an inductor L1. Similar to FIG. 7, the capacitors C3 and C2 are connected in parallel and the parallel circuit is connected in series with the inductor L1, and the capacitors C13 and C12 are connected in parallel and the parallel circuit is connected in series with the inductor L11. Similar to the resonant switching power converter circuit 100 of FIG. 18A, the present invention alternatingly operate the first switching converter 1102 and the second switching converter 1103 to perform power conversion, wherein each of the first switching converter 1102 and the second switching converter 1103 is similar to the switching converter 402 in FIG. 7, which performs power conversion in resonant fashion. The controller 1101 of this embodiment can adopt the circuit structure shown in FIGS. 3 and 4. Referring to FIG. 19, in one embodiment, in the pre-charge mode, what the controller 1101 turns OFF is an upper layer switch (e.g., switch Q21); that is, the controller 1101 of this embodiment is coupled to the first power, the second power, the upper layer switch (e.g., switch Q21), and a node between the upper layer switch and the first switch (e.g., switch Q1) of the second switching converter.

Figure 20:
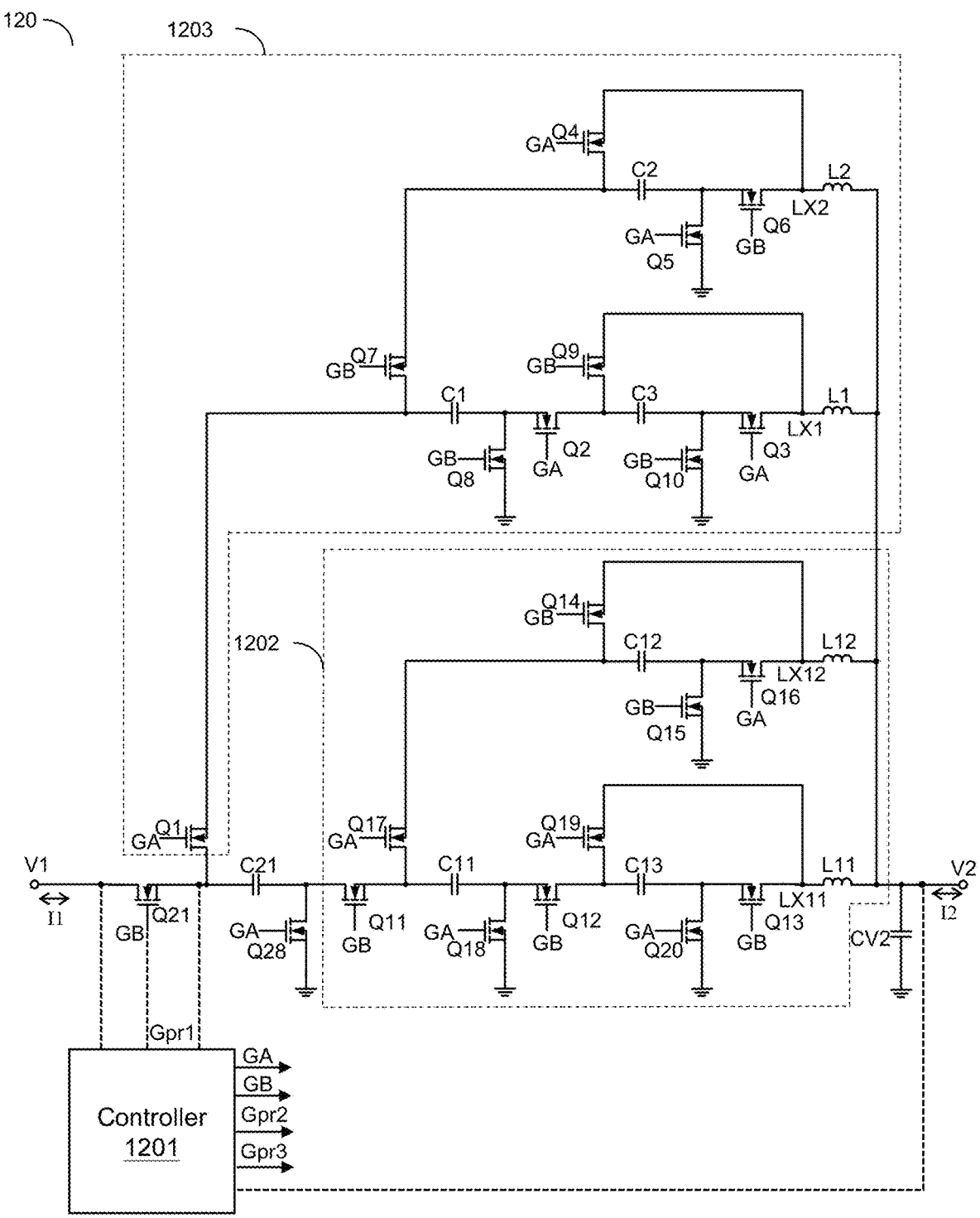
FIG. 20 shows a schematic circuit diagram of a resonant switching power converter circuit according to another embodiment of the present invention.

FIG. 20 shows a schematic circuit diagram of a resonant switching power converter circuit according to another embodiment of the present invention. The resonant switching power converter circuit 120 of FIG. 20 is similar to the resonant switching power converter circuit 100 of the embodiment shown in FIG. 18A, but is different in that: the inductors L11 and L12 of the inductors L1 and L2 of the first switching converter 1202 and the inductors L1 and L2 of the second switching converter 1203 are not directly connected in series with the capacitors C3, C2, C13 and C12, but instead, these inductors are connected in series with the capacitors C3, C2, C13 and C12 through the first switching node LX1, the second switching node LX2, the first switching node LX11 and the second switching node LX12. The resonant switching power converter circuit 120 executes power conversion between the first power and the second power in resonant fashion which is similar to the resonant switching power converter circuit 100 via the inductors L1, L2, L11 and L12 and the capacitors corresponding to the inductors L1, L2, L11 and L12. In this embodiment, a ratio of the first voltage V1 of the first power to the second voltage V2 of the second power is also equal to 8. The controller 1201 of this embodiment can adopt the circuit structure shown in FIGS. 3 and 4. Referring to FIG. 20, in one embodiment, in the pre-charge mode, what the controller 1101 turns OFF is an upper layer switch (e.g., switch Q21); that is, the controller 1101 of this embodiment is coupled to the first power, the second power, the upper layer switch (e.g., switch Q21), and a node between the upper layer switch and the first switch (e.g., switch Q1) of the second switching converter.

Figure 21:
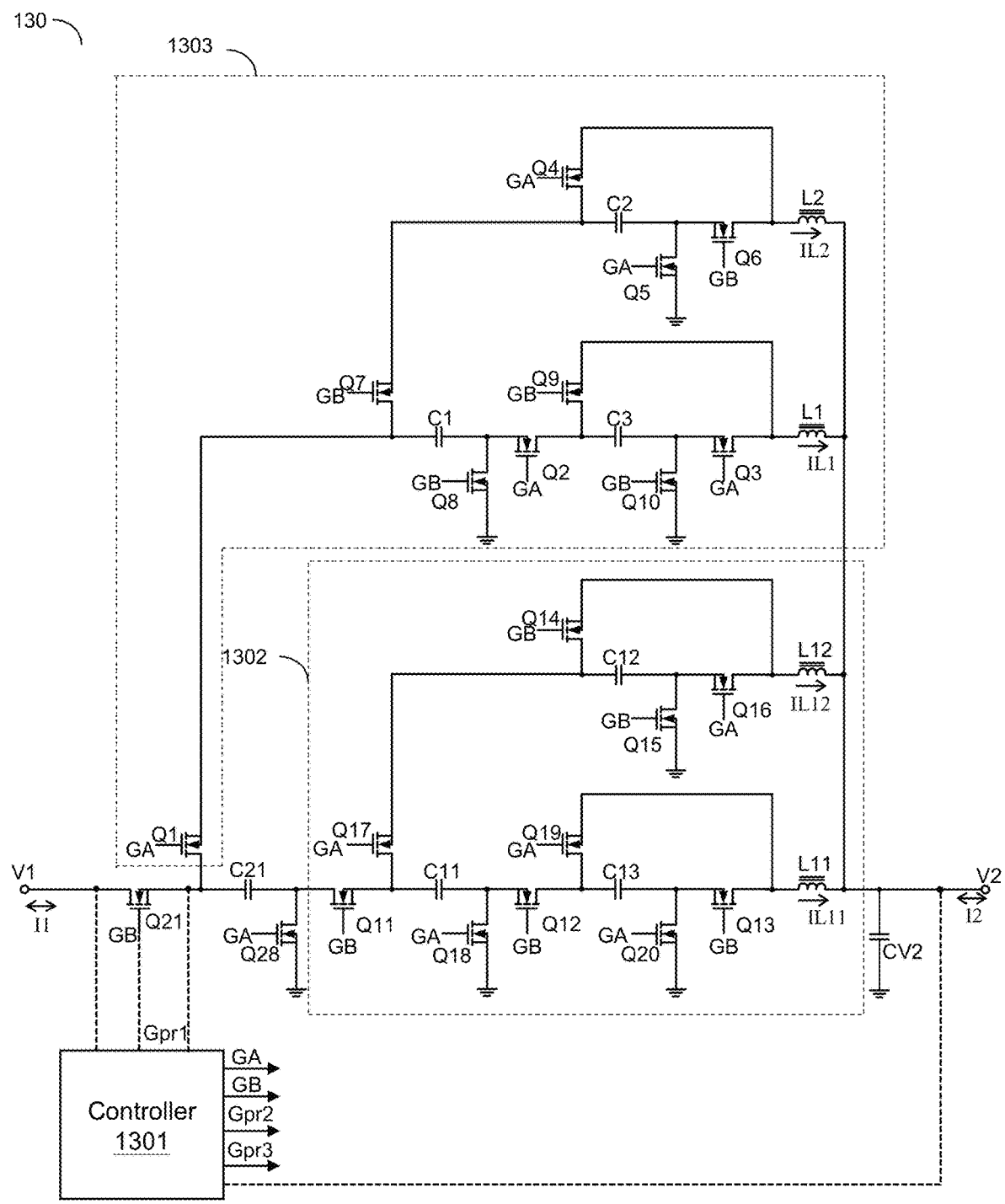
FIG. 21 shows a schematic circuit diagram of a resonant switching power converter circuit according to another embodiment of the present invention.

FIG. 21 shows a schematic circuit diagram of a resonant switching power converter circuit according to another embodiment of the present invention. The resonant switching power converter circuit 130 of FIG. 21 is similar to the resonant switching power converter circuit 120 of the embodiment shown in FIG. 20. The inductor L1, the inductor L2, the inductor L11 and the inductor L12 of the resonant switching power converter circuit 130 have coupled inductance among one another. As a consequence, there is better current balance among the inductor current IL', the inductor current IL2, the inductor current IL11 and the inductor current IL12 of the resonant switching power converter circuit 130, and there is better voltage balance among the capacitor C1, the capacitor C2, the capacitor C11 and the capacitor C12 of the resonant switching power converter circuit 130. In one embodiment, depending upon practical consideration, the resonant switching power converter circuit 130 can arrange all of the inductor L1, the inductor L2, the inductor L11 and the inductor L12 to have coupled inductance among one another or just a part of the above-mentioned four inductors to have coupled inductance among one another. In one embodiment, the inductor L1, the inductor L2, the inductor L11 and the inductor L12 can be configured as at least one transformer. The controller 1301 of this embodiment can adopt the circuit structure shown in FIGS. 3 and 4. Referring to FIG. 21, in one embodiment, in the pre-charge mode, what the controller 1301 turns OFF is an upper layer switch (e.g., switch Q21); that is, the controller 1301 of this embodiment is coupled to the first power, the second power, the upper layer switch (e.g., switch Q21), and a node between the upper layer switch and the first switch (e.g., switch Q1) of the second switching converter.

Figure 22:
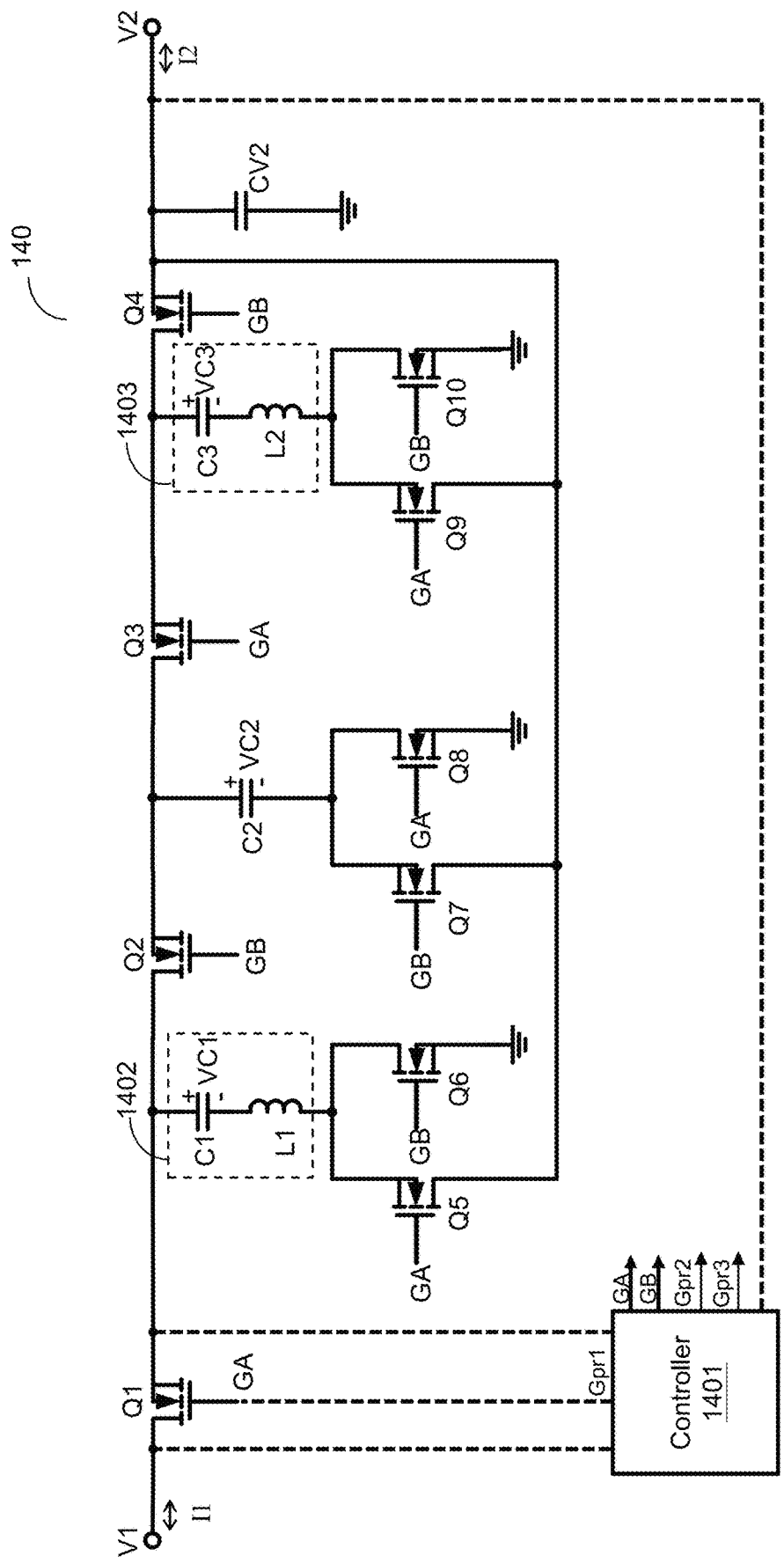
FIG. 22 shows a schematic circuit diagram of a resonant switching power converter circuit according to another embodiment of the present invention.

FIG. 22 shows a schematic circuit diagram of a resonant switching power converter circuit according to another embodiment of the present invention. As shown in FIG. 22, the resonant switching power converter circuit 140 includes resonant capacitors C1 and C3, at least one non-resonant capacitor C2, switches Q1~Q10, resonant inductors L1 and L2, and a controller 1401. The controller 1401 of this embodiment can adopt the circuit structure shown in FIGS. 3 and 4. Referring to FIG. 22, in one embodiment, in the pre-charge mode, what the controller 1401 turns OFF is the first switch (e.g., switch Q1); that is, the controller 1401 of this embodiment is coupled to the first power, the second power, the first switch (e.g., switch Q1), and a node between the first switch and the first resonant capacitor (e.g., capacitor C1).

In one embodiment, in the pre-charge mode, the control circuit 1401 generates pre-charge operation signals, to execute at least one of the following operations: (1) turning ON the switch Q6, and controlling the pre-charge circuit to charge the first resonant capacitor (e.g., capacitor C1) to a first predetermined voltage; (2) turning ON the switches Q2 and Q8, and controlling the pre-charge circuit to charge the non-resonant capacitor C2 to a second predetermined voltage; or (3) turning ON the switches Q2, Q3 and Q10, and controlling the pre-charge circuit to charge the second resonant capacitor (e.g., capacitor C3) to a third predetermined voltage. In one embodiment, the first predetermined voltage is three-fold of the target voltage of the second voltage V2 of the second power; the second predetermined voltage is two-fold of the target voltage of the second voltage V2; and the third predetermined voltage is the target voltage of the second voltage V2.

As shown in FIG. 22, in one embodiment, the controller 1401 is configured to operably generate a first control signal GA corresponding to a first resonant process in the resonant voltage conversion mode and is configured to operably generate a second control signal GB corresponding to a second resonant process in the resonant voltage conversion mode, so as to operate the switches Q1~Q10 in the resonant voltage conversion mode to switch electrical connection relationships of the resonant capacitors C1 and C3 and the at least one non-resonant capacitor C2. The resonant switching power converter circuit 140 includes at least one resonant tank (e.g., resonant tanks 1402 and 1403), wherein the resonant tank 1402 includes a resonant capacitor C1 and a resonant inductor L1 which are connected in series to each other, whereas, the resonant tank 1403 includes a resonant capacitor C3 and a resonant inductor L2 which are connected in series to each other. The switches Q1~Q10 are coupled to the at least one resonator (e.g., resonant tanks 1402 and 1403). In the resonant voltage conversion mode, the switches Q1~Q10 are configured to operably switch electrical connection relationships of the resonant tanks 1402 and 1403 according to the first control signal GA and the second control signal GB in correspondence to the first resonant process and the second resonant process, respectively.

In the first resonant process, a resonant charging operation is performed on the resonant tanks 1402 and 1403. In a second resonant process, a resonant discharging operation is performed on the resonant tanks 1402 and 1403. The at least one non-resonant capacitor C2 is coupled to the at least one resonator (e.g., resonant tanks 1402 and 1403). In the resonant voltage conversion mode, the electrical connection relationship of the non-resonant capacitor C2 with the at least one resonator (e.g., resonant tanks 1402 and 1403) is controlled according to the first control signal GA and the second control signal GB. The voltage across the at least one non-resonant capacitor C2 has a constant ratio to the first voltage V1 of the first power. For example, in this embodiment, the voltage across the at least one non-resonant capacitor C2 is ½ of the first voltage V1. After the pre-charge mode ends, the resonant switching power converter circuit 140 will subsequently operate in the start-up mode, and after the start-up mode ends, the resonant switching power converter circuit 140 will subsequently operate in the resonant voltage conversion mode. The first resonant process and the second resonant process are arranged at different periods in a repeated, alternating manner, to convert the first power to the second power or to convert the second power to the first power. In the resonant voltage conversion mode, the first control signal GA and the second control signal GB have respective ON periods which do not overlap one another, so that the first resonant process and the second resonant process do not overlap each other.

In the first resonant process, according to first control signal GA, the switches Q1, Q3, Q5, Q8 and Q9 are controlled to be ON, whereas, the switches Q2, Q4, Q6, Q7 and Q10 are controlled to be OFF, so that a series connection of the resonant capacitor C1 of the resonant tank 1402 and the resonant inductor L1 is formed between the first power and the second power and so that a series connection of the non-resonant capacitor C2 and the resonant capacitor C3 and the resonant inductor L2 of the resonant tank 1403 is formed between a ground voltage level and the second power, and to thereby charge the resonant capacitors C1 and C3 and to thereby discharge the non-resonant capacitor C2. In the second resonant process, according to second control signal GB, the switches Q2, Q4, Q6, Q7 and Q10 are controlled to be ON, whereas, the switches Q1, Q3, Q5, Q8 and Q9 are controlled to be OFF, so that a series connection of the non-resonant capacitor C2 and the resonant capacitor C1 and the resonant inductor L1 of the resonant tank 1402 is formed between a ground voltage level and the second power and so that a series connection of the resonant capacitor C3 and the resonant inductor L2 of the resonant tank 1403 is formed between a ground voltage level and the second power, and to thereby discharge the resonant capacitors C1 and C3 and to thereby charge the non-resonant capacitor C2.

In regard to how the resonant tanks 1402 and 1403 of the resonant switching power converter circuit 140 shown in FIG. 22 operate, this is well known to those skilled in the art, so the details thereof are not redundantly explained here. In one embodiment according to the present invention, the entire circuit of the resonant switching power converter circuit 140 shown in the figure (except the first power) can support hot-swapping operation.

Figure 23:
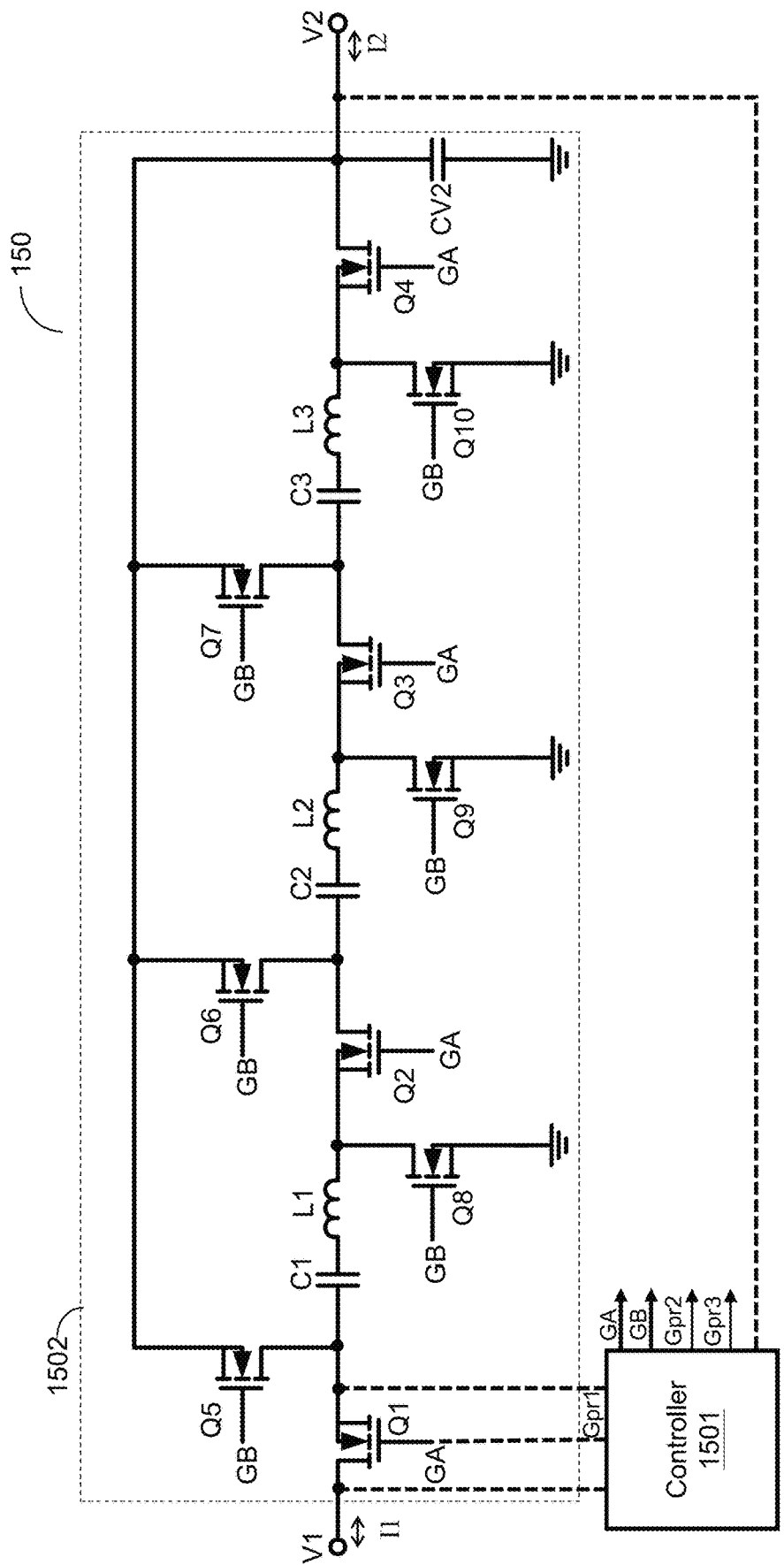
FIG. 23 shows a schematic circuit diagram of a resonant switching power converter circuit according to another embodiment of the present invention.

FIG. 23 shows a schematic circuit diagram of a resonant switching power converter circuit according to another embodiment of the present invention. As shown in FIG. 23, the power converter circuit 150 of the present invention comprises: capacitors C1~C3, switches Q1~Q10, and inductors L1~L3. The switches Q1, Q2 and Q3 are connected in series to the corresponding capacitors C1, C2 and C3, respectively. Certainly, it should be understood that the implementation of the number of the capacitors of the power converter as three in the above-mentioned preferred embodiment is only an illustrative example, but not for limiting the broadest scope of the present invention. In other embodiments, it is also practicable and within the scope of the present invention that the number of the capacitors of the power converter can be any plural number other than three. Likely, the number of the inductors of the power converter also can be any plural number other than three.

The switches Q1~Q10 can switch electrical connection relationships between the capacitors C1~C3 with the inductors L1~L3 according to corresponding control signals. In a first process, the switches Q1~Q4 are ON, whereas, the switches Q5~Q10 are OFF, so that a series connection of the capacitors C1~C3 and the inductors L1~L3 is formed between the first power and the second power, so as to form a charging path. In a second process, the inductors L1~L3 function as discharging inductors; the switches Q5~Q10 are ON, whereas, the switches Q1~Q4 are OFF. As a result, a series connection of the capacitor C1 and the inductors L1 is formed between the second power and the ground voltage; a series connection of the capacitor C2 and the inductors L2 is formed between the second power and the ground voltage; and a series connection of the capacitor C3 and the inductors L3 is formed between the second power and the ground voltage, so that plural discharging paths in parallel are formed. It is noteworthy that, the above-mentioned first process and second process are performed at different periods in an alternating manner. That is, the above-mentioned first process and second process are not performed at the same time. In one embodiment, the first process and the second process are arranged in alternating and repetitive manner, so as to convert the first power to the second power or to convert the second power to the first power. In this embodiment, the DC bias voltages of the capacitors C1, C2 and C3 all are the second voltage V2 of the second power, so the capacitors C1, C2 and C3 of this embodiment will only need to withstand a relatively lower rated voltage. Hence, this embodiment can utilize capacitors having a smaller size.

In one embodiment, the above-mentioned first process has a first resonant frequency and above-mentioned second process has a second resonant frequency. In one preferable embodiment, the first resonant frequency and the second resonant frequency are the same.

In one embodiment, the conversion ratio between the first power and the second power is adjustable to be 4:1, 3:1 or 2:1. More specifically, the power converter in this embodiment has a voltage conversion ratio of 4:1; however, by controlling ON/OFF of the first switches Q1~Q10, the voltage conversion ratio of the power converter can be changed to 3:1. For example, by controlling the switch Q7 to be always ON while at the same time controlling the switches Q4 and Q10 to be always OFF, the conversion ratio of the power converter will be changed to 3:1. Likely, the conversion ratio of the power converter can be changed to 2:1 by properly controlling ON/OFF of the switches Q1~Q10. The controller 1501 of this embodiment can adopt the circuit structure shown in FIGS. 3 and 4. Referring to FIG. 23, in one embodiment, in the pre-charge mode, what the controller 1501 turns OFF is the first switch (e.g., switch Q1); that is, the controller 1501 of this embodiment is coupled to the first power, the second power, the first switch (e.g., switch Q1), and a node between the first switch and the fifth switch (e.g., switch Q5).

Figure 24:
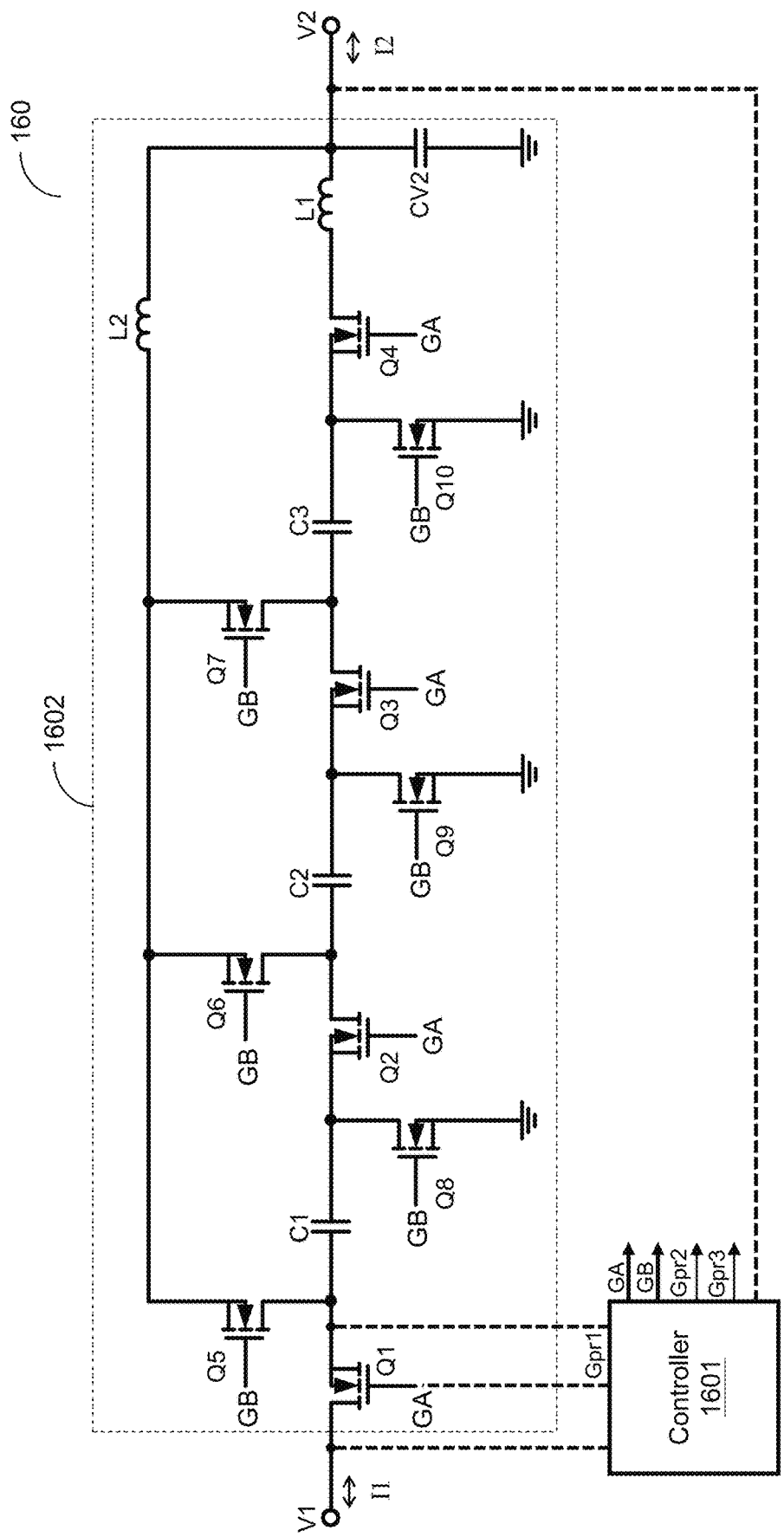
FIG. 24 shows a schematic circuit diagram of a resonant switching power converter circuit according to another embodiment of the present invention.

FIG. 24 shows a schematic circuit diagram of a resonant switching power converter circuit according to another embodiment of the present invention. This embodiment of FIG. 24 is different from the previous embodiment of FIG. 23 in that: this embodiment comprises plural capacitors but they share one charging inductor and one discharging inductor. In this embodiment, there is only one charging inductor and only one discharging inductor regardless how many number of the capacitors is. This embodiment provides a benefit of reducing the number of the inductors. As shown in FIG. 23, the power converter 40 of the present invention comprises: capacitors C1~C3, switches Q1~Q10, and inductors L1~L2. The switches Q1, Q2 and Q3 are connected in series to the corresponding capacitors C1, C2 and C3, respectively. The switch Q4 is connected in series to the inductor L1. Certainly, it should be understood that the implementation of the number of the capacitors of the power converter as three in the above-mentioned preferred embodiment is only an illustrative example, but not for limiting the broadest scope of the present invention. In other embodiments, it is also practicable and within the scope of the present invention that the number of the capacitors of the power converter can be any plural number other than three.

The switches Q1~Q10 can switch electrical connection relationships between the capacitors C1~C3 with the inductor L1 and the inductor L2 according to corresponding control signals. In a first process, the switches Q1~Q4 are ON, whereas, the switches Q5~Q10 are OFF, so that a series connection of the capacitors C1~C3 which is further connected in series to the charging inductor L1 is formed between the first power and the second power, so as to form a first current path for charging operation. In a second process, the switches Q5~Q10 are ON, whereas, the switches Q1~Q4 are OFF, so that a parallel connection of the capacitors C1, C2 and C3 is connected in series to the inductor L2, so as to form plural second paths for discharging operation. It is noteworthy that, in one embodiment, the above-mentioned first process and second process are performed at different periods in an alternating manner, that is, the above-mentioned first process and second process are not performed at the same time, to convert the first power to the second power or to convert the second power to the first power. In this embodiment, the DC bias voltages of the capacitors C1, C2 and C3 all are the second voltage V2 of the second power. Thus, the capacitors C1, C2 and C3 of this embodiment will only need to withstand a relatively lower rated voltage. Hence, this embodiment can utilize capacitors having a smaller size.

In one embodiment, the above-mentioned first process has a first resonant frequency and above-mentioned second process has a second resonant frequency. In one preferable embodiment, the first resonant frequency and the second resonant frequency are the same. In another embodiment, the first resonant frequency and the second resonant frequency are different. In one embodiment, the inductance of the inductor L1 and the inductance of the inductor L2 are the same. In another embodiment, the inductance of the inductor L1 and the inductance of the inductor L2 are different. The controller 1601 of this embodiment can adopt the circuit structure shown in FIGS. 3 and 4. Referring to FIG. 24, in one embodiment, in the pre-charge mode, what the controller 1601 turns OFF is the first switch (e.g., switch Q1); that is, the controller 1601 of this embodiment is coupled to the first power, the second power, the first switch (e.g., switch Q1), and a node between the first switch and the fifth switch (e.g., switch Q5).

Figure 25:
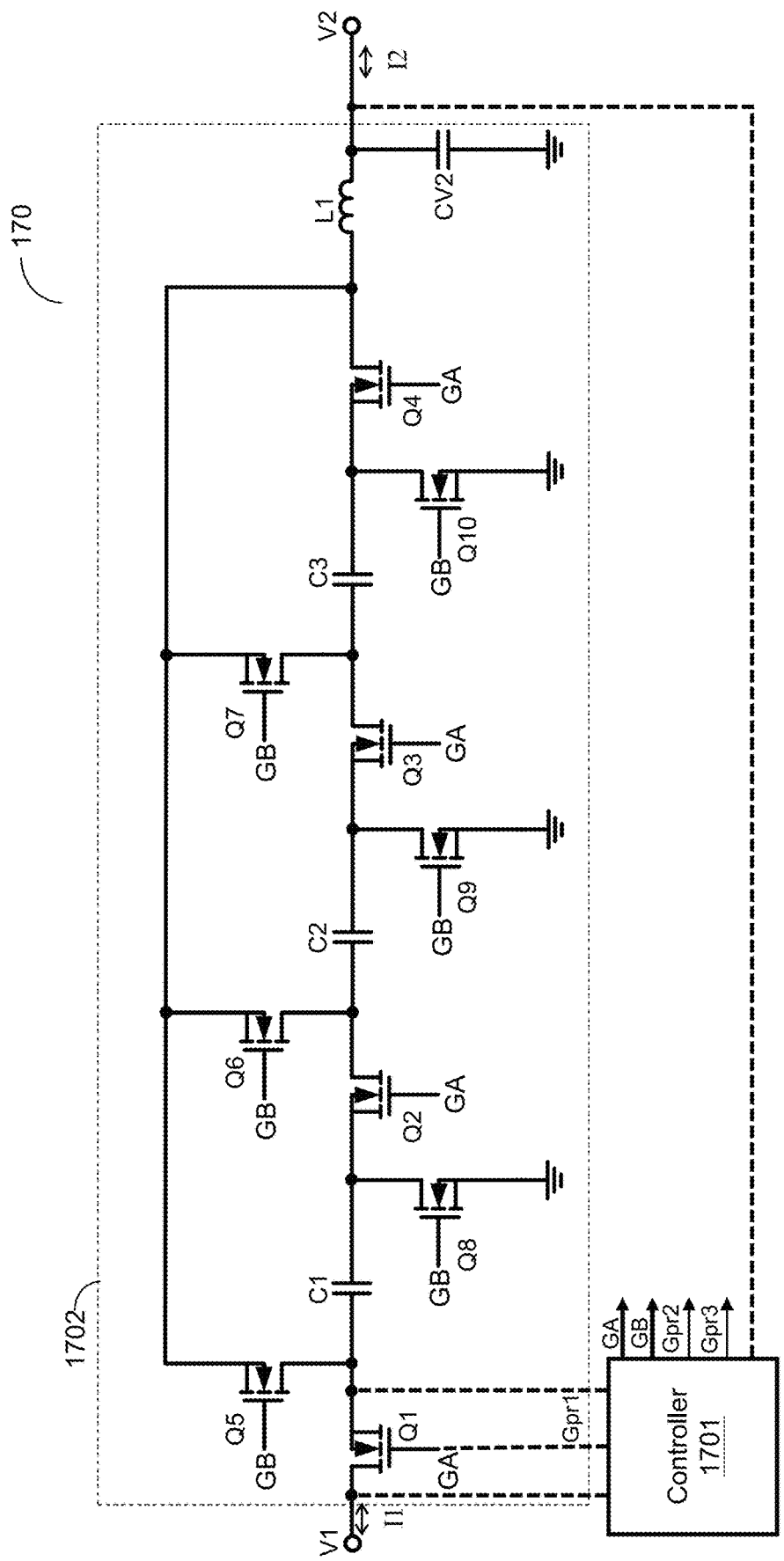
FIG. 25 shows a schematic circuit diagram of a resonant switching power converter circuit according to another embodiment of the present invention.

FIG. 25 shows a schematic circuit diagram of a resonant switching power converter circuit according to another embodiment of the present invention. In this embodiment, one same single inductor L1 serves as both the charging inductor and the discharging inductor; such implementation can reduce the required inductor number to minimum. As shown in FIG. 25, the resonant switching power converter circuit 170 of the present invention comprises: capacitors C1~C3, switches Q1~Q10, and one inductor L1. The switches Q1, Q2 and Q3 are connected in series to the corresponding capacitors C1, C2 and C3, respectively. The switch Q4 is connected in series to the inductor L1. Certainly, it should be understood that the implementation of the number of the capacitors of the resonant switching power converter circuit 170 as three in the above-mentioned preferred embodiment is only an illustrative example, but not for limiting the broadest scope of the present invention. In other embodiments, it is also practicable and within the scope of the present invention that the number of the capacitors of the resonant switching power converter circuit 170 can be any multiple number other than three.

It is noteworthy that, in this embodiment, one same single inductor L1 serves as the charging inductor and the discharging inductor. In the second process, by switching the switches Q1~Q10, the capacitors C1~C3 are connected in parallel and the parallel connection is connected to the same single inductor L1. As one of average skill in the art readily understands by the description above, when the charging inductor and the discharging inductor are one same single inductor L1, a charging resonant current IL1 flows through the same inductor L1 during the first (charging) process, whereas, a discharging resonant current IL2 flows through the same inductor L1 during the second (discharging) process. Neither the charging resonant current IL1 nor the discharging resonant current IL2 flows through any other inductor.

The switches Q1~Q10 can respectively switch electrical connection relationships between the corresponding capacitors C1~C3 and the inductor L1 according to corresponding control signals. In a first process, the switches Q1~Q4 are ON, whereas, the switches Q5~Q10 are OFF, so that a series connection of the capacitors C1~C3 and the inductor L1 is formed between the first power and the second power, which forms a first current path for charging operation. In a second process, the switches Q5~Q10 are ON, whereas, the switches Q1~Q4 are OFF, so that the capacitors C1, C2 and C3 form a parallel connection, which is connected to the inductor L1, to form plural second paths for discharging operation. It is noteworthy that, in one embodiment, the above-mentioned first process and second process are arranged at different periods in a repeated, alternating manner, that is, the above-mentioned first process and second process are not performed at the same time, to convert the first power to the second power or to convert the second power to the first power. In this embodiment, the DC bias voltages of the capacitors C1, C2 and C3 all are the second voltage V2 of the second power. Thus, the capacitors C1, C2 and C3 of this embodiment will only need to withstand a relatively lower rated voltage. Hence, this embodiment can utilize capacitors having a smaller size.

In one embodiment, the conversion ratio between the first power and the second power is adjustable to be 4:1, 3:1 or 2:1.

In one embodiment, the conversion ratio of the resonant switching power converter circuit 170 between the first power and the second power is adjustable to be 4:1, 3:1 or 2:1. For example, by controlling the switch Q7 to be always ON while at the same time controlling the switches Q4 and Q10 to be always OFF, the conversion ratio of the resonant switching power converter circuit 170 will be changed to 3:1. by controlling the switch Q6 to be always ON while at the same time controlling the switches Q9, Q3, Q7, Q10 and Q4 to be always OFF, the conversion ratio of the resonant switching power converter circuit 170 will be changed to 2:1. The controller 1701 of this embodiment can adopt the circuit structure shown in FIGS. 3 and 4. Referring to FIG. 25, in one embodiment, in the pre-charge mode, what the controller 1701 turns OFF is the first switch (e.g., switch Q1); that is, the controller 1701 of this embodiment is coupled to the first power, the second power, the first switch (e.g., switch Q1), and a node between the first switch and the fifth switch (e.g., switch Q5).

The present invention provides a resonant switching power converter circuit as described above, which has the following advantageous features: that a pre-charge mode can be achieved simply by existing switches; that the resonant switching power converter circuit of the present invention supports hot-swapping operation; that a start-up operation can be achieved by existing power devices without requiring an extra pre-stage DC-DC converter; that fewer components and less space are required; that the power conversion efficiency is improved due to omitting the extra pre-stage DC-DC converter; that the resonant switching power converter circuit of the present invention supports soft-starting operation and supports parallel operations for use in a multi-phase resonant switching power converter circuit.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A resonant switching power converter circuit which is configured to convert a first power to a second power or to convert the second power to the first power, wherein the first power includes a first voltage and a first current and the second power includes a second voltage and a second current, the resonant switching power converter circuit comprising:
   at least one switching converter;
   a control circuit, configured to control the switching converter; and
   a pre-charge circuit, coupled between the control circuit and the at least one switching converter;
   wherein the switching converter includes:
      a plurality of capacitors;
      a plurality of switches coupled to the plurality of capacitors, the plurality of switches being controlled by the control circuit to switch coupling relationships of the plurality of capacitors;
      at least one first inductor, which is connected in series with at least a corresponding one of the plurality of capacitors; and
      at least one second inductor, which is connected in series with at least a corresponding one of the plurality of capacitors;
   wherein the control circuit is coupled to the first power, the second power, and the plurality of switches, wherein when the switching converter operates in a pre-charge mode, the control circuit is configured to control a first switch of the plurality of switches to control a coupling relationship between the first power and a first capacitor of the plurality of capacitors, and is configured to control the other switches of the plurality of switches so that when one or more of the plurality of capacitors has a voltage drop which is lower than a predetermined voltage, the pre-charge circuit charges the one or more capacitors to the predetermined voltage;
   wherein the first switch is coupled between the first power and the first capacitor;
   wherein in a start-up mode, a first control signal and at least one second control signal operate the plurality of switches to switch coupling relationships of capacitors coupled to the plurality of switches, such that after the pre-charge mode ends, the resonant switching power converter circuit operates in the start-up mode;
   wherein in the start-up mode, the first control signal and the at least one second control signal have respective ON periods which do not overlap one another, and time lengths of the ON periods increase gradually;
   wherein in a resonant voltage conversion mode, the first control signal and the at least one second control signal operate the plurality of switches to switch coupling relationships of capacitors coupled to the plurality of switches, such that after the start-up mode ends, the resonant switching power converter circuit operates in the resonant voltage conversion mode, to convert the first power to the second power or to convert the second power to the first power;
   wherein in the resonant voltage conversion mode, the first control signal and the at least one second control signal have respective ON periods which do not overlap one another, such that a first process of the resonant voltage conversion mode and a second process of the resonant voltage conversion mode do not overlap each other;
   wherein in the first process, the first control signal operates the plurality of switches so that a series connection of the plurality of capacitors which is further connected in series to the first inductor is formed between the first power and the second power, so as to form a first current path, whereas, in the second process, the at least one second control signals operate the plurality of switches so that each of the plurality of capacitors is individually connected in series to a corresponding one of the second inductors, so as to form plural second current paths concurrently or sequentially;
   wherein the first process and the second process are performed in a repeated and alternating manner, so as to convert the first power to the second power or to convert the second power to the first power.

2. The resonant switching power converter circuit according to claim 1, wherein the predetermined voltage is a target voltage of the second voltage of the second power.

3. The resonant switching power converter circuit according to claim 1, wherein the predetermined voltage is a multiple of a target voltage of the second voltage of the second power.

4. The resonant switching power converter circuit according to claim 1, wherein the pre-charge circuit includes:
   a current source, which is configured to generate a pre-charge current;
   a pre-charge switch circuit, which is coupled between the current source and the plurality of switches except the first switch, wherein in the pre-charge mode, the control circuit controls the pre-charge switch circuit and the plurality of switches except the first switch, so as to control a coupling relationship between the current source and the one or more capacitors, to thereby charge the one or more capacitors to the predetermined voltage by the pre-charge current.

5. The resonant switching power converter circuit according to claim 1, wherein the control circuit includes:
   a duty ratio determination circuit, which is configured to compare a ramp-up voltage at a ramp-up node with a periodic waveform signal, so as to generate a duty ratio signal;
   a duty ratio distribution circuit, which is configured to generate the first control signal and the at least one second control signal according to the duty ratio signal; and
   a ramp-up voltage generation circuit, which is coupled to the duty ratio determination circuit and which is configured to generate the ramp-up voltage at the ramp-up node in the start-up mode;
   wherein the ramp-up voltage at the ramp-up node increases gradually in the start-up mode, so that the duty ratios of the first control signal and the at least one second control signal increase gradually.

6. The resonant switching power converter circuit according to claim 1, wherein in the pre-charge mode, the control circuit controls a conduction level of the first switch, so that a pre-charge current flows from the first power through the first switch to the one or more capacitors, to charge the one or more capacitors to the predetermined voltage.

7. The resonant switching power converter circuit according to claim 1, wherein in the first process, the first control signal controls the plurality of switches so that at least one of the plurality of capacitors is connected in parallel with the second power, and in the second process, the at least one second control signal control the plurality of switches so that at least another one of the plurality of capacitors is connected in parallel with the second power, wherein the capacitor connected in parallel with the second power in the first process is different from the capacitor connected in parallel with the second power in the second process.

8. The resonant switching power converter circuit according to claim 1, wherein the plurality of capacitors include a first capacitor, a second capacitor and a third capacitor;
   wherein in the first process, the plurality of switches operate so that the first capacitor and the third capacitor are connected in series between the first power and the second power, and so that the second capacitor is connected in parallel with the second power; and
   wherein in the second process, the plurality of switches operate so that the second capacitor and the first capacitor are connected in series between the second power and a ground level, and so that the third capacitor is connected in parallel with the second power.

9. The resonant switching power converter circuit according to claim 8, wherein the plurality of switches include a first switch, a second switch, a third switch, a fourth switch, a fifth switch, a sixth switch, a seventh switch, an eighth switch, a ninth switch, and a tenth switch;
   wherein in the first process, the first switch, the second switch and the third switch are ON so that the first capacitor and the third capacitor are connected in series between the first power and the second power, and the fourth switch and the fifth switch are ON so that the second capacitor is connected in parallel with the second power, and the sixth to tenth switches are OFF; and
   wherein in the second process, the sixth switch, the seventh switch and the eighth switch are ON so that the second capacitor and the first capacitor are connected in series between the second power and the ground level, and the ninth switch and the tenth switch are ON so that the third capacitor is connected in parallel with the second power.

10. The resonant switching power converter circuit according to claim 9, wherein the plurality of capacitors further include an output capacitor coupled to the first capacitor, the second capacitor and the third capacitor, and wherein the predetermined voltage includes a first predetermined voltage and a second predetermined voltage; wherein in the pre-charge mode, the control circuit executes at least one of the following operations:
   (1) turning ON the fourth switch, the fifth switch, the seventh switch, the ninth switch and the tenth switch, and controlling the pre-charge circuit to charge each of the output capacitor, the third capacitor and the second capacitor to the first predetermined voltage;
   (2) turning ON the second switch and the tenth switch, and controlling the pre-charge circuit to charge the third capacitor to the first predetermined voltage;
   (3) turning ON the fifth switch, the seventh switch and the eighth switch, and controlling the pre-charge circuit to charge each of the second capacitor and the first capacitor to the first predetermined voltage; or
   (4) turning ON the eighth switch, and controlling the pre-charge circuit to charge the first capacitor to the second predetermined voltage.

11. The resonant switching power converter circuit according to claim 10, wherein the first predetermined voltage is a target voltage of the second voltage of the second power, and the second predetermined voltage is two-fold of the target voltage of the second voltage of the second power.

12. The resonant switching power converter circuit according to claim 8, wherein the resonant switching power converter circuit further includes one of the following configurations and executes corresponding operations:
   (1) wherein the third capacitor is further directly connected to the first inductor to form a first resonant tank, and the second capacitor is further directly connected to the second inductor to form a second resonant tank;
      wherein in the first process, the plurality of switches further control the first resonant tank and the first capacitor to be connected in series with each other between the first power and the second power, and control the second resonant tank to be connected in parallel with the second power; and
      wherein in the second process, the plurality of switches further control the second resonant tank and the first capacitor to be connected in series with each other between the second power and the ground level, and control the first resonant tank to be connected in parallel with the second power;
   (2) wherein a same one single inductor serves as both the first inductor and the second inductor, and this same one single inductor is coupled between the second power and a switching node;
      wherein in the first process, the plurality of switches further control the first capacitor and the third capacitor to be connected in series with said same one single inductor to form a first series circuit between the first power and the second power, and control the second capacitor to be connected in series with said same one single inductor to form a second series circuit and the second series circuit is connected in parallel with the second power; and
      wherein in the second process, the plurality of switches further control the second capacitor and the first capacitor to be connected in series with said same one single inductor to form a third series circuit between the second power and the ground level, and control the third capacitor to be connected in series with said same one single inductor to form a fourth series circuit and the fourth series circuit is connected in parallel with the second power; or
   (3) wherein the first inductor is coupled between the second power and a first switching node, and the second inductor is coupled between the second power and a second switching node;
      wherein in the first process, the plurality of switches further control the first capacitor and the third capacitor to be connected in series with the first inductor via the first switching node to form a first series circuit between the first power and the second power, and control the second capacitor to be connected in series with the second inductor via the second switching node to form a second series circuit and the second series circuit is connected in parallel with the second power; and
      wherein in the second process, the plurality of switches further control the second capacitor and the first capacitor to be connected in series with the second inductor via the second switching node to form a third series circuit between the second power and the ground level, and control the third capacitor to be connected in series with the first inductor via the first switching node to form a fourth series circuit and the fourth series circuit is connected in parallel with the second power.

13. The resonant switching power converter circuit according to claim 1, wherein the at least one switching converter includes a first switching converter and a second switching converter, wherein the first switching converter and the second switching converter are connected in parallel between the first power and the second power, wherein each of the first switching converter and the second switching converter operates the corresponding plurality of switches therein in opposite phases to the other of the first switching converter and the second switching converter.

14. The resonant switching power converter circuit according to claim 12, wherein in the configuration (3), both the first inductor and the second inductor operate in a continuous conduction mode.

15. The resonant switching power converter circuit according to claim 1, further comprising an upper layer capacitor and a plurality of upper layer switches, wherein the at least one switching converter includes a first switching converter and a second switching converter, wherein the upper layer capacitor, the plurality of upper layer switches, the first switching converter and the second switching converter are coupled with one another to form a fundamental topology;
wherein in the first process, the plurality of upper layer switches further control the first switching converter and the upper layer capacitor to be connected in series with each other between the first power and the second power, and control the second switching converter to be connected in parallel with the second power; and
wherein in the second process, the plurality of upper layer switches further control the second switching converter and the upper layer capacitor to be connected in series with each other between the second power and the ground level, and control the first switching converter to be connected in parallel with the second power.

16. The resonant switching power converter circuit according to claim 15, wherein a ratio between the first voltage of the first power and the second voltage of the second power is 8.

17. The resonant switching power converter circuit according to claim 15, further comprising: a further upper layer capacitor, a plurality of further upper layer switches, a further upper layer first switching converter and a further upper layer second switching converter, wherein the further upper layer capacitor, the plurality of further upper layer switches, the further upper layer first switching converter and the further upper layer second switching converter are coupled to one another according to the fundamental topology so that the fundamental topology expands recursively, wherein each of the further upper layer first switching converter and the further upper layer second switching converter has a configuration corresponding to the resonant switching power converter circuit of a layer below.

18. The resonant switching power converter circuit according to claim 1, wherein the at least one first inductor includes a plurality of charging inductors which are connected in series with the plurality of capacitors respectively, and the at least one second inductor includes a plurality of discharging inductors; wherein in the first process, the plurality of switches operate so that a series connection of the plurality of capacitors and the plurality of charging inductors is formed between the first power and the second power, so as to form a first current path, whereas, in the second process, the plurality of switches operate so that each of the plurality of capacitors is individually connected in series to a corresponding one of the discharging inductors, so as to form plural second current paths in parallel.

19. The resonant switching power converter circuit according to claim 1, wherein the at least one first inductor and the at least one second inductor have a coupled inductance.

20. The resonant switching power converter circuit according to claim 19, wherein the at least one first inductor and the at least one second inductor which have the coupled inductance are configured as coupled inductors or configured as a transformer.

21. The resonant switching power converter circuit according to claim 1, wherein the at least one first inductor is one single first inductor and the at least one second inductor is one single second inductor.

22. The resonant switching power converter circuit according to claim 1, wherein an inductance of the one single first inductor is identical to an inductance of the one single second inductor.

23. The resonant switching power converter circuit according to claim 1, wherein one same single inductor serves as the at least one first inductor and the at least one second inductor.

24. The resonant switching power converter circuit according to claim 1, wherein the first process has a first resonant frequency and the second process has a second resonant frequency, and the first resonant frequency and the second resonant frequency are identical.

25. The resonant switching power converter circuit according to claim 1, wherein the first process has a first resonant frequency and the second process has a second resonant frequency, and the first resonant frequency and the second resonant frequency are different.

26. The resonant switching power converter circuit according to claim 1, wherein a voltage conversion ratio between the first voltage of the first power to the second voltage of the second power is adjustable to be 4:1, 3:1 or 2:1.

27. The resonant switching power converter circuit according to claim 8, wherein a voltage conversion ratio between the first voltage of the first power to the second voltage of the second power is 4:1.

28. The resonant switching power converter circuit according to claim 27, wherein in a steady state, a voltage across the first capacitor is equal to two-fold of the second voltage, a voltage across the third capacitor is equal to the second voltage, and a voltage across the second capacitor is equal to the second voltage.

29. The resonant switching power converter circuit according to claim 8, wherein one same single inductor serves as the at least one first inductor and the at least one second inductor; wherein in a two-fold conversion mode, a portion of the plurality of switches are always ON, another portion of the plurality of switches are always OFF, and a further other portion of the plurality of switches are configured to switch one of the second capacitor and the first capacitor so that in the first process, the switched one capacitor is connected in series with the one same single inductor between the first power and the second power, and in the second process, the switched one capacitor is connected in series with the one same single inductor and the series connection is connected in parallel with the second power, such that a ratio between the first voltage of the first power and the second voltage of the second power is 2, wherein the switched one capacitor and the one same single inductor operate in resonant fashion to achieve power conversion between the first power and the second power.

30. The resonant switching power converter circuit according to claim 8, wherein in a two-fold conversion mode, a portion of the plurality of switches are always ON, another portion of the plurality of switches are always OFF, and a further other portion of the plurality of switches are configured to switch the first capacitor so that in the first process, the first capacitor is connected in series with the first inductor between the first power and the second power, and in the second process, the first capacitor is connected in series with the first inductor and the series connection is connected in parallel with the second power, such that a ratio between the first voltage of the first power and the second voltage of the second power is 2, wherein the first capacitor and the first inductor operate in resonant fashion to achieve power conversion between the first power and the second power.

31. The resonant switching power converter circuit according to claim 8, wherein one same single inductor serves as the at least one first inductor and the at least one second inductor; wherein in a three-fold conversion mode, a portion of the plurality of switches are always ON, another portion of the plurality of switches are always OFF, and a further other portion of the plurality of switches are configured to switch the first capacitor and the third capacitor so that in the first process, the first capacitor and the third capacitor are connected in series with the one same single inductor between the first power and the second power, and in the second process, the first capacitor and the third capacitor are connected in parallel and the parallel connection is connected in series with the one same single inductor, and the series connection is connected in parallel with the second power, such that a ratio between the first voltage of the first power and the second voltage of the second power is 3, wherein the first capacitor and the one same single inductor operate in resonant fashion, and/or, the third capacitor and the one same single inductor operate in resonant fashion, to achieve power conversion between the first power and the second power.

32. The resonant switching power converter circuit according to claim 8, wherein in a three-fold conversion mode, a portion of the plurality of switches are always ON, another portion of the plurality of switches are always OFF, and a further other portion of the plurality of switches are configured to switch the first capacitor and the third capacitor so that in the first process, the first capacitor and the third capacitor are connected in series with the first inductor between the first power and the second power, and in the second process, the first capacitor and the third capacitor are connected in series with the second inductor and the first inductor respectively, and the series connections are connected in parallel with the second power, such that a ratio between the first voltage of the first power and the second voltage of the second power is 3, wherein the first capacitor and the second inductor operate in resonant fashion, and/or, the third capacitor and the first inductor operate in resonant fashion, to achieve power conversion between the first power and the second power.

33. The resonant switching power converter circuit according to claim 1, wherein a ratio between the predetermined voltage and the first voltage of the first power is constant.

34. The resonant switching power converter circuit according to claim 8, wherein one same single inductor serves as the at least one first inductor and the at least one second inductor, wherein a capacitance of the first capacitor is far more greater than a capacitance of the third capacitor and a capacitance of the second capacitor, such that a first resonant frequency of the third capacitor and the one same single inductor and a second resonant frequency of the second capacitor and the one same single inductor are both greater than or equal to 10-fold of a third resonant frequency of the first capacitor and the one same single inductor.

35. A resonant switching power converter circuit which is configured to convert a first power to a second power or to convert the second power to the first power, wherein the first power includes a first voltage and a first current and the second power includes a second voltage and a second current, the resonant switching power converter circuit comprising:
  at least one resonant tank which includes a resonant capacitor and a resonant inductor connected in series with each other;
  a plurality of switches coupled to the at least one resonant tank, wherein in a resonant voltage conversion mode, the plurality of switches operate according to a first control signal and a second control signal to switch a coupling relationship of the at least one resonant tank in correspondence to a first resonant process and a second resonant process, wherein in the first resonant process a resonant charging operation is performed on the at least one resonant tank, and in the second resonant process a resonant discharging operation is performed on the at least one resonant tank;
  a control circuit, configured to control the plurality of switches;
  a pre-charge circuit, coupled between the control circuit and the plurality of switches except a first switch of the plurality of switches; and
  at least one non-resonant capacitor, coupled to the at least one resonant tank, wherein in the resonant voltage conversion mode, the first control signal and the second control signal switching coupling relationships of the non-resonant capacitor and the at least one resonant tank, and a voltage across the non-resonant capacitor is maintained at a constant ratio to the first power;
  wherein the control circuit is coupled to the first power, the second power, and the plurality of switches, wherein when the resonant switching power converter circuit operates in a pre-charge mode, the control circuit is configured to control the first switch to control a coupling relationship between the first power and the at least one resonant tank, and is configured to control the other switches of the plurality of switches so that when one or more of the resonant capacitor and the at least one non-resonant capacitor has a voltage drop which is lower than a predetermined voltage, the pre-charge circuit charges the one or more capacitors to the predetermined voltage;
  wherein the first switch is coupled between the first power and the resonant capacitor;
  wherein in a start-up mode, the first control signal and the second control signal operate the plurality of switches to switch coupling relationships of the resonant capacitor and the at least one non-resonant capacitor, such that after the pre-charge mode ends, the resonant switching power converter circuit operates in the start-up mode;
  wherein in the start-up mode, the first control signal and the second control signal have respective ON periods which do not overlap one another, and time lengths of the ON periods increase gradually;
  wherein in a resonant voltage conversion mode, the first control signal and the second control signal have respective ON periods which do not overlap one another, such that the first resonant process and the second resonant process do not overlap each other, such that after the start-up mode ends, the resonant switching power converter circuit operates in the resonant voltage conversion mode, to convert the first power to the second power or to convert the second power to the first power.

36. The resonant switching power converter circuit according to claim 35, wherein the predetermined voltage is a target voltage of the second voltage of the second power.

37. The resonant switching power converter circuit according to claim 35, wherein the predetermined voltage is a multiple of a target voltage of the second voltage of the second power.

38. The resonant switching power converter circuit according to claim 35, wherein the pre-charge circuit includes:
- a current source, which is configured to generate a pre-charge current;
- a pre-charge switch circuit, which is coupled between the current source and the plurality of switches except the first switch, wherein in the pre-charge mode, the control circuit controls the pre-charge switch circuit and the plurality of switches except the first switch, so as to control a coupling relationship between the current source and one or more of the resonant capacitor and the at least one non-resonant capacitor, to thereby charge the one or more capacitors to the predetermined voltage by the pre-charge current.

39. The resonant switching power converter circuit according to claim 35, wherein the control circuit includes:
- a duty ratio determination circuit, which is configured to compare a ramp-up voltage at a ramp-up node with a periodic waveform signal, so as to generate a duty ratio signal;
- a duty ratio distribution circuit, which is configured to generate the first control signal and the second control signal according to the duty ratio signal; and
- a ramp-up voltage generation circuit, which is coupled to the duty ratio determination circuit and which is configured to generate the ramp-up voltage at the ramp-up node in the start-up mode;
- wherein the ramp-up voltage at the ramp-up node increases gradually in the start-up mode, so that the duty ratios of the first control signal and the second control signal increase gradually.

40. The resonant switching power converter circuit according to claim 35, wherein in the pre-charge mode, the control circuit controls a conduction level of the first switch, so that a pre-charge current flows from the first power through the first switch to one or more of the resonant capacitor and the at least one non-resonant capacitor, to charge the one or more capacitors to the predetermined voltage.

41. The resonant switching power converter circuit according to claim 35, wherein a ratio between the predetermined voltage and the first voltage of the first power is constant.

42. The resonant switching power converter circuit according to claim 35, wherein the resonant switching power converter circuit comprises at least two resonant capacitors including a first resonant capacitor and a second resonant capacitor, and wherein the predetermined voltage includes a first predetermined voltage, a second predetermined voltage and a third predetermined voltage, and wherein the plurality of switches include the first switch, a second switch, a third switch, a fourth switch, a fifth switch, a sixth switch, a seventh switch, an eighth switch, a ninth switch, and a tenth switch;
- wherein in the pre-charge mode, the control circuit executes at least one of the following operations:
  - (1) turning ON the sixth switch, and controlling the pre-charge circuit to charge the first resonant capacitor to the first predetermined voltage;
  - (2) turning ON the second switch and the eighth switch, and controlling the pre-charge circuit to charge the non-resonant capacitor to the second predetermined voltage; or
  - (3) turning ON the second switch, the third switch and the tenth switch, and controlling the pre-charge circuit to charge the second resonant capacitor to the third predetermined voltage.

43. The resonant switching power converter circuit according to claim 42, wherein the first predetermined voltage is three-fold of a target voltage of the second voltage of the second power; the second predetermined voltage is two-fold of the target voltage of the second voltage; and the third predetermined voltage is the target voltage of the second voltage.

\* \* \* \* \*